(12) United States Patent
Kalaboukis et al.

(10) Patent No.: US 11,691,080 B2
(45) Date of Patent: Jul. 4, 2023

(54) RECONFIGURING REALITY USING A REALITY OVERLAY DEVICE

(71) Applicant: SAMSUNG ELECTRONICS CO., LTD., Gyeonggi-do (KR)

(72) Inventors: Chris Kalaboukis, Los Gatos, CA (US); Stephan Douris, San Jose, CA (US); Marc Perry, San Francisco, CA (US); Barry Crane, Menlo Park, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 683 days.

(21) Appl. No.: 15/335,503

(22) Filed: Oct. 27, 2016

(65) Prior Publication Data

US 2017/0043252 A1 Feb. 16, 2017

Related U.S. Application Data

(63) Continuation of application No. 12/257,832, filed on Oct. 24, 2008, now Pat. No. 9,480,919.

(51) Int. Cl.
*H04N 5/222* (2006.01)
*G06F 3/03* (2006.01)
(Continued)

(52) U.S. Cl.
CPC ............ *A63F 13/53* (2014.09); *A63F 13/335* (2014.09); *A63F 13/65* (2014.09); *A63F 13/90* (2014.09);
(Continued)

(58) Field of Classification Search
CPC .. H04L 29/06; G06F 3/01–0484; G06F 3/011; G02C 3/003; A63F 13/10; G02B 27/017; H04W 4/21
See application file for complete search history.

(56) References Cited

U.S. PATENT DOCUMENTS

| | | |
|---|---|---|
| 6,452,544 B1 | 9/2002 | Hakala et al. |
| 6,625,299 B1 * | 9/2003 | Meisner .................... G01S 5/16 348/169 |

(Continued)

FOREIGN PATENT DOCUMENTS

JP WO 2008/047889 * 4/2008 ........... G02B 27/017

OTHER PUBLICATIONS

Diaz, Jesus "Air Tagging Device "Sekai Camera"", http://tonchidot.com/Sekai_Camera.html; Gizmodo.com, (Sep. 11, 2008), 2 pages.

*Primary Examiner* — Lin Li
(74) *Attorney, Agent, or Firm* — Sughrue Mion, PLLC

(57) ABSTRACT

Virtual entities are displayed alongside real world entities in a wearable reality overlay device worn by the user. Information related to an environment proximate to the wearable device is determined. For example, a position of the wearable device may be determined, a camera may capture an image of the environment, etc. Virtual entity image information representative of an entity desired to be virtually displayed is processed based on the determined information. An image of the entity is generated based on the processed image information as a non-transparent region of a lens of the wearable device, enabling the entity to appear to be present in the environment to the user. The image of the entity may conceal a real world entity that would otherwise (Continued)

be visible to the user through the wearable device. Other real world entities may be visible to the user through the wearable device.

16 Claims, 14 Drawing Sheets

(51) Int. Cl.
| | |
|---|---|
| G03B 17/00 | (2021.01) |
| G06K 9/00 | (2022.01) |
| G09G 5/00 | (2006.01) |
| A63F 13/53 | (2014.01) |
| A63F 13/90 | (2014.01) |
| A63F 13/65 | (2014.01) |
| G06F 3/01 | (2006.01) |
| G06F 3/04815 | (2022.01) |
| G06T 19/00 | (2011.01) |
| A63F 13/335 | (2014.01) |
| G02B 27/01 | (2006.01) |
| G06T 19/20 | (2011.01) |
| A63F 13/213 | (2014.01) |
| G09G 3/00 | (2006.01) |

(52) U.S. Cl.
CPC .......... *G02B 27/0172* (2013.01); *G06F 3/011* (2013.01); *G06F 3/012* (2013.01); *G06F 3/04815* (2013.01); *G06T 19/006* (2013.01); *G06T 19/20* (2013.01); *A63F 13/213* (2014.09); *A63F 2300/105* (2013.01); *A63F 2300/1043* (2013.01); *A63F 2300/1093* (2013.01); *A63F 2300/205* (2013.01); *A63F 2300/303* (2013.01); *A63F 2300/69* (2013.01); *A63F 2300/8082* (2013.01); *G02B 2027/014* (2013.01); *G02B 2027/0138* (2013.01); *G02B 2027/0178* (2013.01); *G06T 2219/2004* (2013.01); *G06T 2219/2016* (2013.01); *G09G 3/001* (2013.01); *G09G 5/003* (2013.01)

(56) References Cited

U.S. PATENT DOCUMENTS

| | | | |
|---|---|---|---|
| 7,206,022 B2 | 4/2007 | Miller et al. | |
| 8,055,296 B1 | 11/2011 | Persson et al. | |
| 8,651,964 B2* | 2/2014 | Brick | A63F 13/211 463/2 |
| 2002/0024675 A1* | 2/2002 | Foxlin | G02B 27/017 356/620 |
| 2002/0044152 A1 | 4/2002 | Abbott, III et al. | |
| 2002/0060648 A1* | 5/2002 | Matsui | G06F 3/0304 345/8 |
| 2003/0227542 A1 | 12/2003 | Zhang et al. | |
| 2004/0119662 A1* | 6/2004 | Dempski | G01S 3/7864 345/8 |
| 2004/0212630 A1* | 10/2004 | Hobgood | G06F 3/011 345/633 |
| 2005/0073531 A1* | 4/2005 | Kuroki | G06T 19/006 345/633 |
| 2005/0195277 A1* | 9/2005 | Yamasaki | G03B 17/00 348/61 |
| 2006/0093185 A1* | 5/2006 | Kato | G06K 9/00261 382/103 |
| 2006/0176242 A1 | 8/2006 | Jaramaz et al. | |
| 2007/0091011 A1 | 4/2007 | Selbrede | |
| 2007/0132662 A1 | 6/2007 | Morita | |
| 2008/0266323 A1 | 10/2008 | Biocca et al. | |
| 2009/0003662 A1 | 1/2009 | Joseph et al. | |
| 2009/0096714 A1* | 4/2009 | Yamada | G02B 27/017 345/8 |
| 2009/0189974 A1 | 7/2009 | Deering | |
| 2009/0289955 A1 | 11/2009 | Douris et al. | |
| 2009/0289956 A1* | 11/2009 | Douris | G01C 21/3602 345/633 |
| 2010/0001926 A1 | 1/2010 | Amirparviz et al. | |
| 2010/0013739 A1* | 1/2010 | Sako | G06F 3/0484 345/8 |
| 2010/0033830 A1 | 2/2010 | Yung | |
| 2010/0085462 A1* | 4/2010 | Sako | H04N 21/44218 348/333.01 |

* cited by examiner

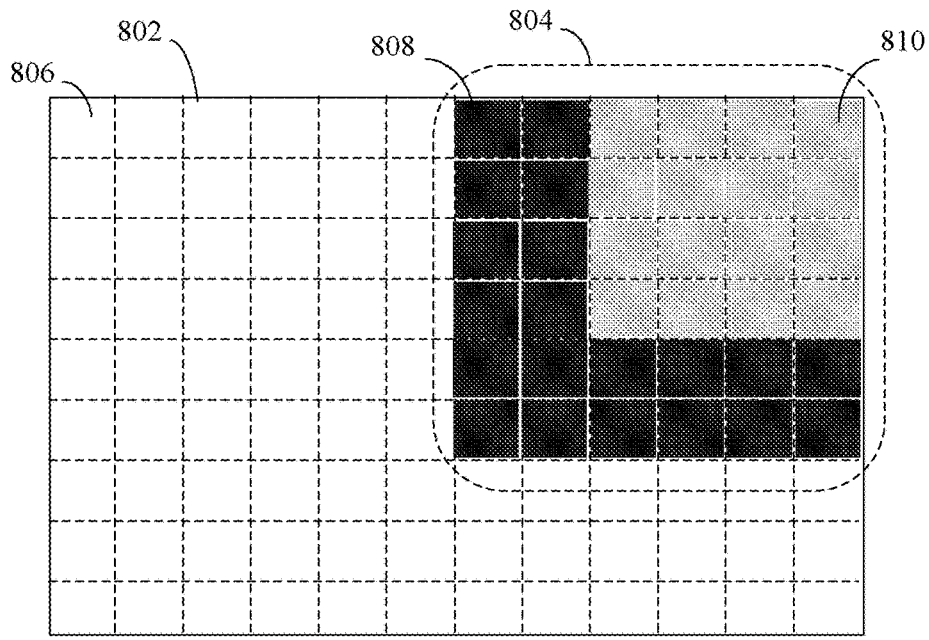

902
determine information related to an environment proximate to a wearable device 904
process image information based at least on the determined information, the image information being representative of an entity 906
receive the processed image information 908
generate an image of the entity based on the processed image information as a non-transparent region of a lens of the wearable device to enable the entity to appear to be present in the environment to a user of the wearable device

1102 determine at least one of a location of the second entity, an orientation of the second entity, or a speed at which the second entity is moving

1104 process the image information representative of the first entity based on the determined at least one of the location of the second entity, the orientation of the second entity, or the speed at which the second entity is moving

1202 capture an image of the second entity

1204 process the captured image to determine a location of the second entity

1206 optically align the image of the first entity on the lens with the second entity visible through the lens to at least partially conceal the second entity to the user of the wearable device

FIG. 12

RECONFIGURING REALITY USING A REALITY OVERLAY DEVICE

CROSS REFERENCE TO RELATED APPLICATIONS

This application is a continuation of and claims priority from co-pending U.S. patent application Ser. No. 12/257,832, filed on Oct. 24, 2008, entitled RECONFIGURING REALITY USING A REALITY OVERLAY DEVICE, which is hereby incorporated by reference.

BACKGROUND OF THE INVENTION

Field of the Invention

The present invention relates to the overlay of virtual entities on a real-world environment.

Background Art

Virtual reality (VR) is a technology which allows a user to interact with a computer-simulated environment. Virtual reality is typically presented to a user as a visual experience, displayed either on a computer screen or through special (e.g., stereoscopic) displays. Some virtual reality systems may include additional sensory information, such as sound provided through speakers or headphones, and/or tactile information. Users can interact with a virtual environment or a virtual artifact (VA) through the use of standard input devices such as a keyboard and mouse, or through multi-modal devices such as a wired glove, a Polhemus boom arm, or an omnidirectional treadmill.

A virtual reality environment can be similar to the real world. For example, virtual reality environments include simulations for pilot or combat training. Alternatively, a virtual reality environment can differ significantly from reality. For instance, virtual reality environments include games and alternate world simulations (e.g., a simulation of a medieval world).

In virtual reality techniques that provide a visual experience to the user through a computer screen or special display, only virtual entities are included in the provided virtual experience. In other words, the visual experience provided to the user is entirely virtual. Real world entities in the field of view of the user are not included in the provided visual experience. What is desired are ways of including both real world entities and virtual reality entities in a virtual reality experience provided to users.

BRIEF SUMMARY OF THE INVENTION

Virtual entities are displayed alongside real world entities in a wearable reality overlay device worn by the user. Information related to an environment proximate to the wearable device is determined. For example, a position of the wearable device may be determined, an image of the environment may be captured, etc. Virtual entity image information representative of an entity desired to be virtually displayed is processed based on the determined information. An image of the entity is generated based on the processed image information as a non-transparent region of a lens of the wearable device, enabling the entity to appear to be present in the environment to the user.

The image of the entity may be generated to conceal a real world entity that would otherwise be visible to the user through the wearable device. Other real world entities may be visible to the user through the wearable device.

The wearable device has numerous applications. In an example configuration, a virtual gaming environment is enabled by a wearable device. Image information corresponding to one or more virtual game entities is received. A next game state is determined based on a determined position of the wearable device, an image of the local environment, one or more rules of a game, a virtual player artificial intelligence, a game field configuration, a current game state, and/or information regarding at least one additional real-world game player. The image information is processed based on the determined next game state. One or more images corresponding to the one or more virtual game entities are generated based on the processed image information as one or more corresponding non-transparent region of a lens of the wearable device The virtual game entities enable a user of the wearable device to participate in a game that incorporates virtual entities and real world entities.

In another example, a wearable device is provided. The wearable device includes a position monitor, a lens, and a display generator. The position monitor is configured to determine a position of the wearable device. The display generator is configured to receive image information processed based at least on the determined position. The image information is representative of an entity. The display generator is configured to generate an image of the entity as a non-transparent region of the lens based on the processed image information to enable the entity to appear to be present to a user of the wearable device in an environment proximate to the wearable device.

In one example configuration, the display generator includes an image projector configured to project the image of the entity on the lens. In another example configuration, the display generator is a display device that includes an array of image pixels. The lens may include the display device. The display device is configured to selectively activate pixels of the array of image pixels to form the image of the entity.

The wearable device may include one or more lenses. For example, the wearable device may include a right lens and a left lens corresponding to a right eye and a left eye of the user. One or more display generators may be present to generate an image of the entity on each lens.

In a further example, the wearable device may include an image processor configured to process image information representative of the entity based at least on the determined position of the wearable device, the determined orientation of the wearable device, or the determined speed of the wearable device to generate the processed image information.

In a further example, the display generator may be configured to optically align the image of the first entity on the lens with a second entity visible through the lens to at least partially conceal the second entity to the user of the wearable device. The image processor may be configured to process image information representative of the second entity based at least on a determined position of the second entity, a determined orientation of the second entity, or a speed of the second entity to generate the processed image information.

In an example configuration, the wearable device may include a camera configured to capture an image of the environment. The image processor may be configured to process an image of the second entity captured by the camera to determine a location of the second entity.

In a still further example configuration, the wearable device may include a game engine. The display generator may generate an image of a virtual playing field and/or other virtual game features, virtual game participants, and/or virtual game implements.

The game engine is configured to enable the user to participate in a game configured to take place in the virtual playing field.

The image processor and/or game engine may be internal to the wearable device. In a still further example configuration, the wearable device may include a communication interface configured for wired and/or wireless communications with devices (e.g., a server) that may be remote from the wearable device that may include the image processor and/or the game engine.

In another configuration, a reality overlay image processing server is provided. The reality overlay image processing server includes a communication interface, storage, and an entity image processor. The communication interface is configured to receive position information from a wearable device. The storage stores image information representative of an entity. The entity image processor is configured to process the image information representative of the entity based at least on the determined position. The communication interface is configured to transmit the processed image information to the wearable device. The wearable device is configured to receive the processed image information, and to generate an image of the entity as a non-transparent region of a lens based on the processed image information to enable the entity to appear to be present to a user of the wearable device in an environment proximate to the wearable device.

In a further example, the reality overlay image processing server includes a game engine configured to enable the user to participate in a game that includes the entity.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8 shows a portion of a display of a display device, according to an example embodiment.

FIG. 9 shows a flowchart for performing reality overlay, according to an example embodiment of the present invention.

FIG. 11 shows a flowchart providing a process for processing position information regarding a real-world entity, according to an example embodiment of the present invention.

FIG. 12 shows a flowchart that is an example of the flowchart shown in FIG. 11, according to an embodiment of the present invention.

Figure 1:
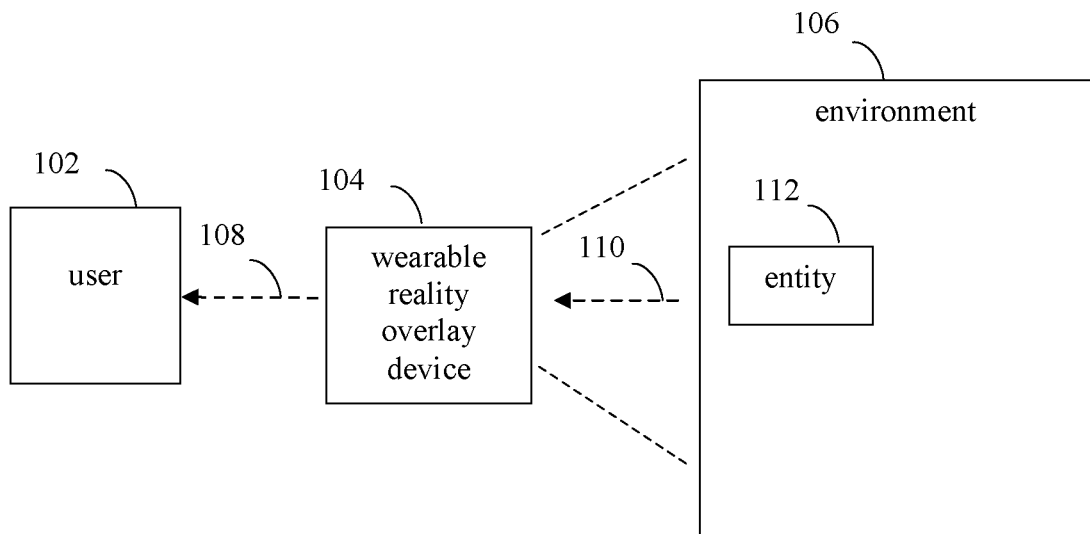
FIG. 1 shows a block diagram of a system for reconfiguring reality using a wearable reality overlay device, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments are described herein that enable real world entities and virtual entities to be provided to a user in a virtual environment. In an embodiment, a virtual reality overlay device includes a lens through which a user can view the surrounding environment. The reality overlay device is configured to selectively generate opaque portions (e.g., in black-and-white, grayscale, and/or color) of the lens to correspond to virtual entities displayed to the user. The opaque portions of the lens may conceal real world entities that would otherwise be visible to the user through the lens. One or more other portions of the lens remain transparent through which the user can view corresponding portions of the surrounding environment to view real world entities. In this manner, the reality overlay device can "re-present" or "re-paint" sections of the users view.

Example embodiments and applications of the present invention are described in the following section.

II. Example Embodiments for Reconfiguring Reality using a Reality Overlay Device FIG. 1 shows a block diagram of a system 100 for reconfiguring reality using a wearable reality overlay device 104 (hereinafter "wearable device 104"), according to an example embodiment of the present invention. In FIG. 1, a user 102 interacts with wearable device 104 to view environment 106. For example, wearable device 104 may have the form of a pair of glasses, a pair of goggles, a mask, or other wearable item through which user 102 may view environment 106. As shown in FIG. 1, environment includes a real-world entity 112. Real-world entity 112 may be any living being, geographical feature, structure, or other entity described elsewhere herein or otherwise known.

As shown in FIG. 1, wearable device 104 enables user 102 to view a portion of environment 106. For example, a real environment view 110 is received by wearable device 104 that includes real-world entity 112. Wearable device 104 is configured to process real environment view 110 to generate a processed environment view 108 that is viewable by user 102. Wearable device 104 may be configured to process real environment view 110 in various ways. For example, wearable device 104 may be configured to insert images of one or more entities to appear in processed environment view 108 that are not present in environment 106. In this manner, even though the one or more entities are not present in environment 106, the one or more entities appear to be present to user 102. The one or more entities may be separate entities or may partially or entirely conceal real world entities that are present in environment 106.

Figure 2:
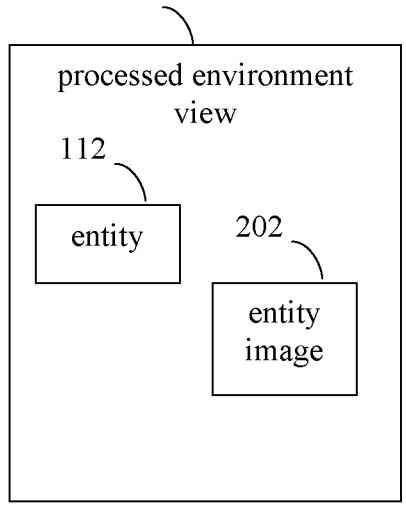
FIG. 2 shows an example of a processed environment view that may be generated by the wearable device of FIG. 1, according to an embodiment of the present invention.

FIG. 2 shows a block diagram of an example of processed environment view 108 that may be generated by wearable device 104, in an embodiment. As shown in FIG. 2, wearable device 104 may process real environment view 110 so that an entity image 202 is present in processed environment view 108 that is viewable by user 102, but that is not present in real environment view 110. Entity image 202 may be an image of any object, living being, geographical feature, structure, or other entity described elsewhere herein or otherwise known. In this example, when user 102 views environment 106 through wearable device 104 as shown in FIG. 1, user 102 may see real world entity 112 and entity image 202 even though the entity corresponding to entity image 202 is not present in environment 106. Entity image 202 is inserted into processed environment view 108 by wearable device 104.

Figure 3:
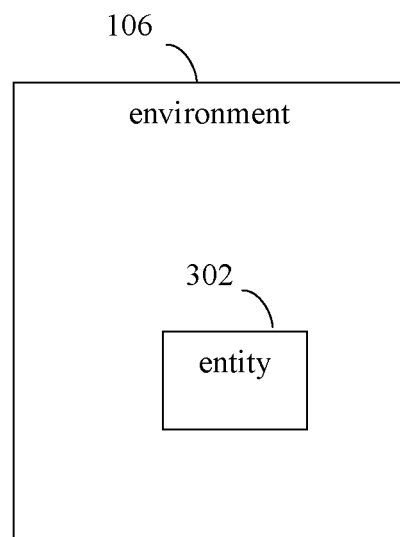
FIG. 3 shows a view of an example environment that includes an entity.
Figure 4:
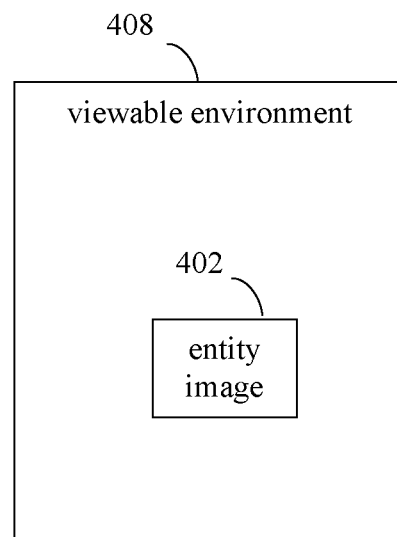
FIG. 4 shows an example of a processed environment view that may be generated by the wearable device of FIG. 1, according to an embodiment of the present invention.

In another example, environment 106 may appear as shown in FIG. 3. FIG. 3 shows a block diagram of environment 106 including a real-world entity 302. Entity 302 may be any object, living being, geographical feature, structure, or other real world entity described elsewhere herein or otherwise known. FIG. 4 shows a block diagram of an example of processed environment view 408 that may be generated by wearable device 104 based upon receiving a real environment view 110 corresponding to FIG. 3, in an embodiment. As shown in FIG. 4, wearable device 104 may process real environment view 110 so that an entity image 402 is present in processed environment view 408. Entity image 402 may be an image of any entity described herein or otherwise known, including an entity that is similar or different than entity 302. In this example, when user 102 views environment 106 through wearable device 104 as shown in FIG. 1, user 102 may see processed environment view 408, with entity image 402 partially or entirely concealing entity 302. Entity image 402 is inserted into processed environment view 408 by wearable device 104 in alignment with entity 302 to conceal entity 302 from view by user 102.

In this manner, wearable device 104 enables real world entities (e.g., entity 112) to be viewed by user 102 alongside virtual entities (e.g., entity image 202) and/or enables real world entities (e.g., entity 302) to be concealed by a virtual entities (e.g., entity image 402). User 102 may be enabled to select which virtual entities are to be made viewable by wearable device 104, including being enabled to select virtual entities to conceal real world entities in the field of view of user 102 through wearable device 104. Accordingly, wearable device 104 has a multitude of applications. Some examples of applications of wearable device include:

1. Virtual interior decorating: User 102 could select a new painting or an image of a wall to appear to be present in a home, and the selected painting or wall image may be generated as a virtual entity by wearable device 104. User 102 could select particular paintings and/or other images to appear as virtual entities according to their preference. User 102 can view the paintings and/or other images using wearable device 104. As user 102 turns his/her head from side to side, wearable device 104 can adjust the view of the virtual images to the user, virtually moving the paintings/other images from side to side, to maintain the paintings/other images in their original positions. For example, wearable device 104 may include position/orientation detectors, such as one or more accelerometers.

2. Different views for different people: User 102 may prefer to have a room painted a particular color, such as green. In such case, wearable device 104 could be configured to cause the exposed portions of a wall in the view of user 102 to appear to be colored green. In another example, a married couple may not be able to decide on a color with which to paint their living room. Using wearable device 104, the couple could leave the living room a particular color, such as white, and a first wearable device 104 of the husband may be configured to "virtually paint" the room red (i.e., cause the walls of the living room to appear red when viewed through first wearable device 104), while a second wearable device 104 of the wife may be configured to virtually paint the room yellow.

3. One or more aspects of reality may be "substituted" in this way: If user 102 prefers to view another person (e.g., a significant other) in an alternative piece of clothing than currently worn by the person (e.g., a leopard skin jacket), user 102 may be enabled to configure wearable device 104 to cause the alternative piece of clothing to appear to be worn by the person when the person is viewed through wearable device 104. In such case, wearable device 104 may be configured to conceal the piece of clothing currently worn by the person with an image of the alternative piece of clothing (e.g., as described above with respect to FIGS. 3 and 4) so that the person appears to be wearing the alternative piece of clothing.

4. Such aspects may include substituting physical aspects of persons: The appearance of persons may be "edited" by wearable device 104. If user 102 prefers to view a person's face, hair, body, arms, legs, etc., to appear in a manner other than they appear in reality, wearable device 104 may be configured to cause the person to appear as such. For example, wearable device 104 may be configured to "erase" blemishes (e.g., conceal blemishes with generated skin tone images) and/or otherwise change the visual appearance of other people. For instance, if user 102 prefers to see a particular celebrity when looking at another person (e.g., their spouse), wearable device 104 may be configured to conceal the person with an image of the celebrity (e.g., as described above with respect to FIGS. 3 and 4) so that the celebrity appears to be present to user 102 instead of the person. Wearable device 104 may be configured to continually update the generated image of the celebrity to maintain concealing the person with the image of the celebrity as the person talks, moves about, etc.

Example embodiments and applications of wearable device 104 are described in the following subsections.

A. Example Wearable Reality Overlay Device System and Method Embodiments

Example embodiments are described in this section for wearable device 104. The example embodiments described herein are provided for illustrative purposes, and are not limiting. Further structural and operational embodiments, including modifications/alterations, will become apparent to persons skilled in the relevant art(s) from the teachings herein.

Figure 5:
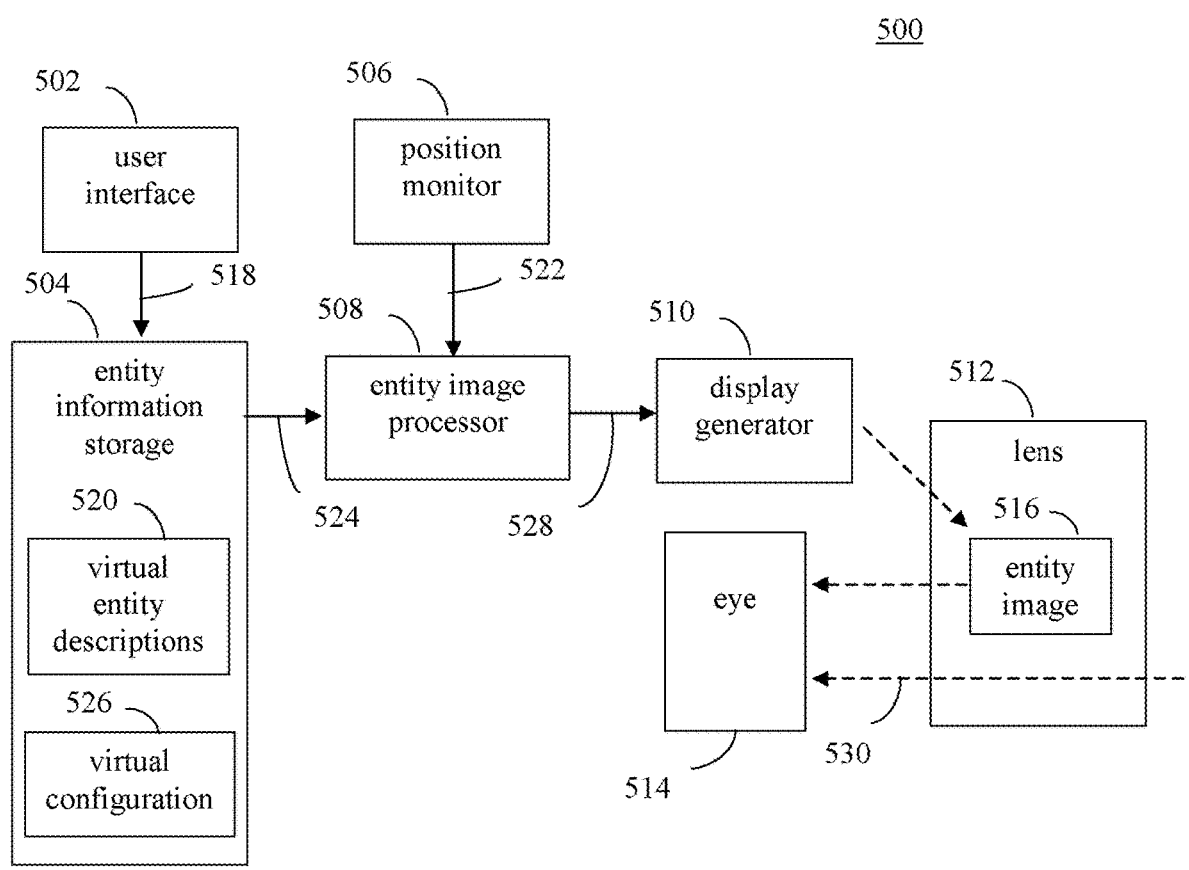
FIG. 5 shows a block diagram of an example wearable reality overlay device, according to an embodiment of the present invention.

FIG. 5 shows a block diagram of an example wearable reality overlay device 500 (hereinafter "wearable device 500"), according to an embodiment of the present invention. Wearable device 500 is an example of wearable device 104 shown in FIG. 1. As shown in FIG. 5, wearable device 500 includes a user interface 502, an entity information storage 504, a position monitor 506, an entity image processor 508, a display generator 510, and a lens 512. As shown in FIG. 5, wearable device 500 interacts with an eye 514. Eye 514 may be an eye of user 102 shown in FIG. 1, for example.

User interface 502 enables a user to configure wearable device 500. User interface 502 may be configured to enable user 102 to edit, input, and/or select one or more virtual entity images to be displayed to user 102 by wearable device 500. User device 502 may also be configured to enable user 102 to select an initial position, a size, and/or an orientation for the one or more virtual entity images. User device 502 may also be configured to enable user 102 to select a real entity to which a virtual entity image may be assigned.

User interface 502 may include any number and combination of user interface elements, including an interface provided by a computer (mobile or desktop), such as an interface provided by a computer-based or web-based application. For example, user interface 502 may include a keyboard, a thumb wheel, a mouse pointer, a roller ball, a stick pointer, a display, any number of virtual interface elements (e.g., such as a keyboard or other user interface element displayed by a display generator 510 at lens 512), a voice recognition system, and/or other user interface elements described elsewhere herein or otherwise known.

Entity information storage 504 may store a library of one or more virtual entity descriptions 520 that user 102 may select for display by wearable device 104 as one or more corresponding virtual entity images. User interface 502 may be configured to provide a list of the one or more virtual entity descriptions 520 from which user 102 may select virtual entities to be displayed. User interface 502 may interact with entity information storage 504 to provide such information as virtual entity configuration information 518, which is received and stored as virtual configuration 526 by entity information storage 504. Virtual entity configuration information 518 may include the selection provided by user 102 of the one or more virtual entities for display, including the selected initial position, size, and/or orientation of the virtual entity images. Virtual entity configuration information 518 may also include the identification of one or more real world entities with which one or more of the selected virtual entities are to be associated (e.g., to partially or entirely conceal the real world entities). Each virtual entity description 520 stored in entity information storage 504 may include information necessary for graphically rendering an image of the corresponding virtual entity in two or three dimensions, depending on the type of virtual entity.

Entity information storage 504 may include one or more of any type of storage mechanism for storing virtual entity descriptions 520 and virtual configuration 526, including a hard disk drive, an optical disc drive, a memory device such as a RAM device, a ROM device, etc., and/or any other suitable type of storage medium.

Position monitor 506 is configured to determine location information regarding wearable device 500. The location of wearable device 500, including the orientation of wearable device 500, varies as the user wearing wearable device 500 moves about. For example, position monitor 506 may be configured to determine a location (e.g., coordinates of wearable device 500) of wearable device 500, an orientation of wearable device 500, and/or a speed at which wearable device 500 is moving. For example, position monitor 506 may include a global positioning system (GPS) device configured to enable coordinates of wearable device 500 to be determined. In an embodiment, position monitor 506 may include one or more gyroscopes that may be configured to determine an orientation of wearable device 500. In another embodiment, position monitor 506 may include an accelerometer that may be used to determine an orientation and/or speed at which wearable device 500 is moving. In further embodiments, position monitor 506 may include additional and/or alternative mechanisms for determining a location, an orientation, and/or a speed of wearable device 500. As shown in FIG. 5, position monitor 506 generates a position information signal 522.

As shown in FIG. 5, entity image processor 508 receives virtual entity image information 524. For example, entity image processor 508 may access entity information storage 504 for image information relating to a virtual entity image to be displayed, and in response, entity information storage 504 may output the requested image information as virtual entity image information 524. Virtual entity image information 524 may include one or more of virtual entity descriptions 520, for instance. As shown in FIG. 5, entity image processor 508 also receives position information signal 522. Entity image processor 508 is configured to process virtual entity image information 524 for display. For example, entity information processor 508 may process virtual entity image information 524 based upon position information of wearable device 500 received in position information signal 522. In this manner, entity information processor 508 may be enabled to configure a location, size, and/or orientation of a virtual entity image displayed by wearable device 500 to user 102 relative to a location, orientation, and speed of wearable device 500. As shown in FIG. 5, entity image processor 508 generates a processed image information signal 528. Processed image information signal 528 includes image information configured for display, to display one or more virtual entity images for the user of wearable device 500 at the proper location, size, and orientation.

Entity image processor 508 may be implemented in hardware, software, firmware, or any combination thereof. For example, entity image processor 508 may be implemented as computer code configured to be executed in one or more processors. Alternatively, entity image processor 508 may be implemented as hardware logic/electrical circuitry.

Display generator 510 receives processed image information signal 528, and generates a virtual entity image 516 displayed at lens 512. Virtual entity image 516 is viewable by an eye 514 of user 102 that is aligned with lens 512. Entity image 516 is an example of entity images 202 and 402 described above. Display generator 510 displays entity image 516 at lens 512 at a size and a location of lens 512 according to processed image information signal 528. As shown in FIG. 5, portions of lens 512 where entity image 516 is not present are transparent (e.g., light 530 from environment 106 is shown passing through lens 512 to eye 514). Display generator 510 may be configured to generate entity image 516 at lens 512 as focused at infinity or at other suitable distance, as desired. Display generator 510 may include any suitable mechanism for displaying entity image 516 at lens 512, such as a projection mechanism, a display device, or other suitable mechanism.

Figure 6:
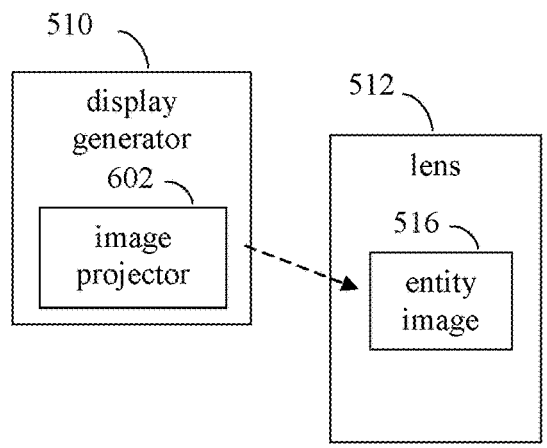
FIGS. 6 and 7 show block diagrams of a display generator, according to example embodiments of the present invention.

For example, FIG. 6 shows a block diagram of an embodiment of display generator 510. In FIG. 6, display generator 510 includes an image projector 602. Image projector 602 is configured to project a display of entity images, such as entity image 516, on lens 512, similar to a heads-up display (e.g., a head mounted display or helmet mounted display) that may be used in aircraft cockpits, automobiles, and other types of vehicles. In such an embodiment, lens 512 may include a surface coating or inner layer of a reflective material, such as a metal, that is configured to receive light representative of entity image 516 projected from image projector 602, and reflect the light towards eye 514 (similar to a heads-up display combiner), but that is transparent to light received from the environment. Image projector 602 may include any suitable type of projection unit to project entity image 516, including a cathode ray tube (CRT), a light emitting diode (LED), a liquid crystal display (LCD), a digital micro-mirror device (digital light processing (DLP) device), a liquid crystal on silicon (LCoS) device, etc.

Figure 7:
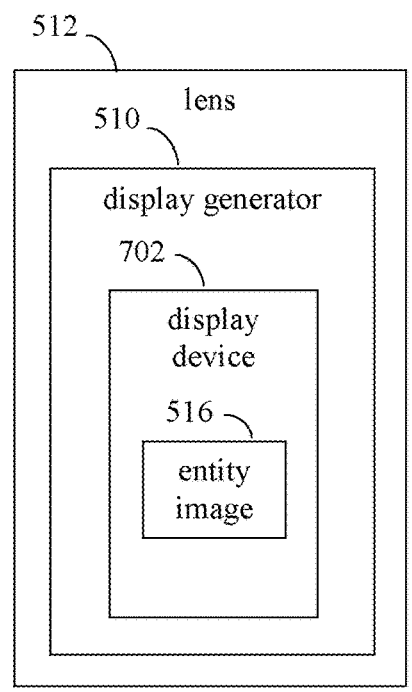

In another example, FIG. 7 shows a block diagram of another embodiment of display generator 510. In FIG. 7, display generator 510 is integrated with lens 512. For example, display generator 510 may be an inner or outer layer of lens 512. As shown in FIG. 7, display generator 510 includes a display device 702. Display device 702 is configured to display entity images, such as entity image 516. For example, display device 702 may be an LCD that can have selectively transparent and non-transparent portions. Display device 702 may be opaque where entity image 516 is displayed, while other portions of display device 702 are transparent. For instance, display device 702 may be an LCD where each pixel includes electrode layers made of a transparent conductor (such as indium tin oxide (ITO)), a pair of polarizing filter layers, and an enclosed liquid crystal material that can selectively be made transparent or non-transparent (e.g., by application of an electric field).

For instance, FIG. 8 shows a display 800 that is a portion of a complete display of display device 702, according to an example embodiment. As shown in FIG. 8, display 800 includes an array of pixels 806. In the example of FIG. 8, display 800 includes a 12×9 array of pixels 806. A first portion 802 of display 800 is transparent, and a second portion 804 of display 800 is not transparent. Thus, light from the environment may pass through first portion 802. However, light may not pass through second portion 804, and instead a virtual entity image is present at second portion 804 (e.g., entity image 516). Second portion 804 includes a first section of pixels 808 displaying a first color and a second section of pixels 810 displaying a second color. For instance, second portion 804 may be a corner portion of a virtual painting, where first section of pixels 808 is a frame portion of the painting, and section of pixels 810 is a painted portion of the painting.

Example structure and operation of wearable device 500 is further described with respect to FIG. 9. FIG. 9 shows a flowchart 900 for performing reality overlay, according to an example embodiment of the present invention. Flowchart 900 may be performed by wearable device 500, for example. Further structural and operational embodiments will be apparent to persons skilled in the relevant art(s) based on the discussion regarding flowchart 900. Flowchart 900 and wearable device 500 are described as follows.

Flowchart 900 begins with step 902. In step 902, information related to an environment proximate to a wearable device is determined. For example, as described above, position monitor 506 may determine a location of wearable device 500 in the local environment (e.g., environment 106 shown in FIG. 1). Furthermore, as described further below, location information may be determined regarding real entities in the local environment using image recognition, radio signatures, and/or other location information determining techniques.

In step 904, image information is processed based at least on the determined information, the image information being representative of an entity. For example, as described above, entity image processor 508 may receive image information from entity information storage 504 as virtual entity image information 524, and may receive position information 522 from position monitor 506. Virtual entity image information 524 may include image information representative of one or more virtual entity images. Entity image processor 508 may process the received image information based on position information 522. As described further below, the received image information may be additionally and/or alternatively processed based on determined location information regarding real entities in the local environment.

As described above, position information 522 may include a location, an orientation, and/or a speed of wearable device 500. Entity image processor 508 is configured to process virtual entity image information 524 based on position information 522. For example, the closer that the location of wearable device 500 is to the location of the virtual entity, the larger will be the image of the virtual entity generated for display by entity information processor 508. Conversely, the farther away that the location of wearable device 500 is from the location of the virtual entity, the smaller will be the image of the virtual entity generated for display by entity information processor 508. Thus, entity information processor 508 may determine a distance between wearable device 500 and the virtual entity based upon position information of wearable device 500 received in position information signal 522 and the location of the virtual entity provided in virtual entity image information 524. Entity image processor 508 may scale the size of the virtual entity generated for display based upon the determined distance. Furthermore, the location of the virtual entity image displayed in lens 512 is configured by entity image processor 508 according to an orientation of wearable device 500 received in position information signal 522. Still further, the orientation of the virtual entity image displayed in lens 512 may be configured by entity image processor 508 according to the orientation of the virtual entity provided in virtual entity image information 524 relative to wearable device 500. Still further, entity image processor 508 may process virtual entity image information 524 according to the speed at which wearable device 500 is moving, because movement of wearable device 500 may modify the orientation, location, and/or size of the virtual entity image displayed by wearable device 500 at a particular rate.

In step 906, the processed image information is received. For example, as described above, display generator 510 receives processed image information signal 528.

In step 908, an image of the entity is generated based on the processed image information as a non-transparent region of a lens of the wearable device to enable the entity to appear to be present in the environment to a user of the wearable device. For example, as described above, display generator 510 generates an image of one or more virtual entities based on processed image information signal 528. The generated image of the one or more virtual entities is displayed at lens 516, such as entity image 516 shown in FIG. 5. Entity image 516 is generated as a nontransparent region of lens 512. The generation of entity image 516 on lens 512 enables a virtual entity corresponding to entity image 516 to appear to be present in the environment (e.g., environment 106) to user 102 wearing wearable device 500. Transparent regions of lens 512 enable user 102 to view real-world entities in the environment alongside the virtual entity corresponding to entity image 516.

In an embodiment, wearable device 500 may include a single lens 512 through which one or both eyes of user 102 view the local environment and view generated entity images. In another embodiment, wearable device 500 may include a pair of lenses, with each lens aligned with the corresponding eye of user 102. In such an embodiment, steps 904-908 of flowchart 900 may be performed once for both lenses (such that each lens receives the same processed entity image), or may be performed separately for each lens (such that a different entity image is received by each lens).

Figure 10:
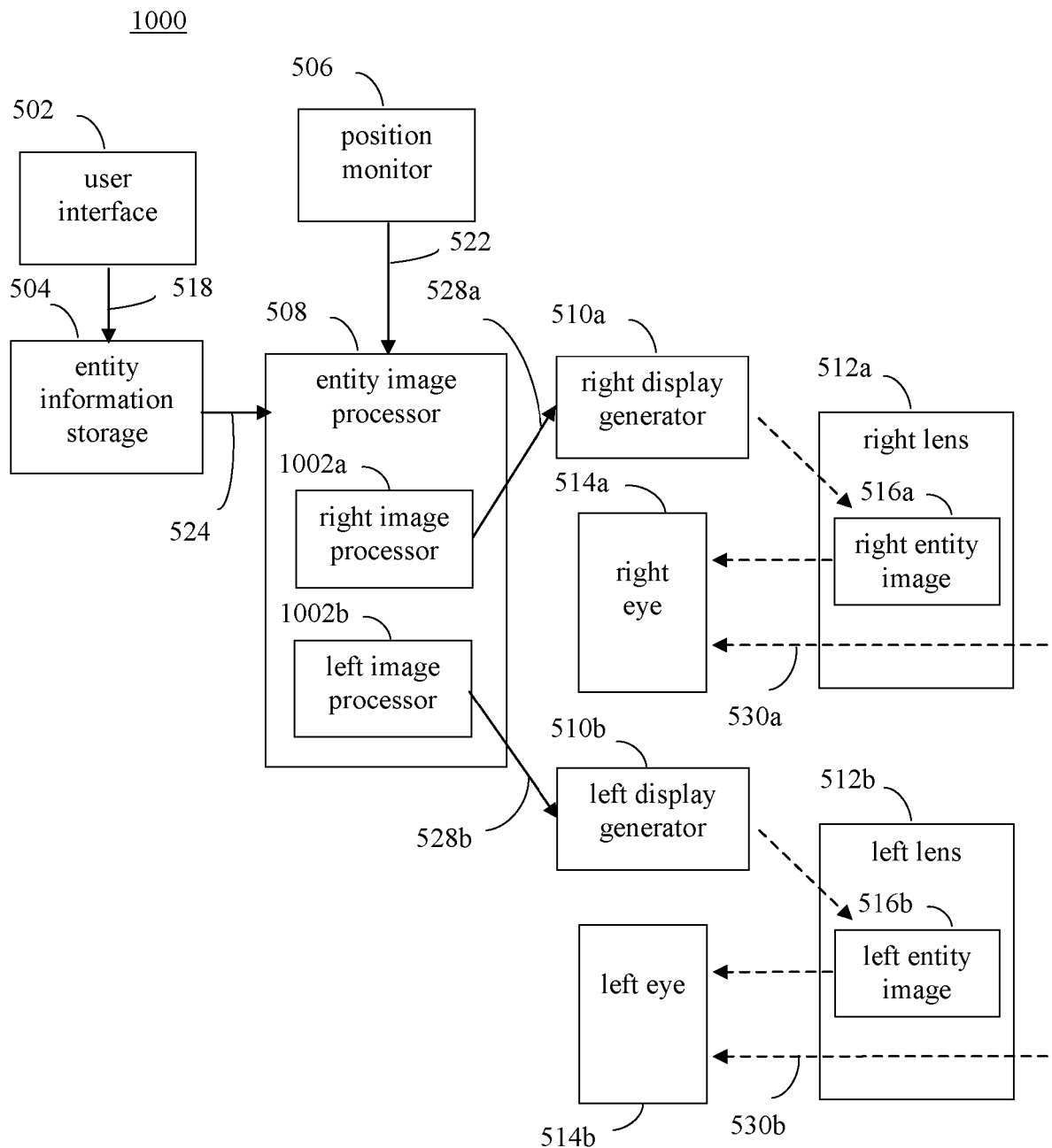
FIG. 10 shows a block diagram of a wearable device, according to an example embodiment of the present invention.

For instance, FIG. 10 shows a block diagram of a wearable device 1000, according to an example embodiment of the present invention. As shown in FIG. 10, wearable device 1000 is configured to generate right and left entity images 516a and 516b at right and left lenses 512a and 512b, respectively, which are respectively aligned with right and left eyes 514a and 514b of user 102. In the example of FIG. 10, entity image processor 508 includes a right image processor 1002a and a left image processor 1002b. Right image processor 1002a receives position information signal 522 and virtual entity image information 524, and generates processed right image information signal 528a. Right display generator 510a receives processed right image information signal 528a and generates right entity image 516a at right lens 512a. Left image processor 1002a receives position information signal 522 and virtual entity image information 524, and generates processed left image information signal 520b. Left display generator 510b receives processed left image information signal 528b and generates left entity image 516b at left lens 512b.

Right eye 514a views right entity image 516a at right lens 512a, and left eye 514b views left entity image 516b at left lens 512b. Processed right image information signal 528a and processed left image information signal 528b may be configured such that right entity image 516a and left entity image 516b form a stereoscopic image of the virtual entity to user 102, creating an illusion of depth. In this manner, the virtual entity corresponding to right and left entity images 516a and 516b may appear to be three-dimensional when viewed through wearable device 1000.

As described above, wearable device 104 may be configured to superimpose a virtual entity image on a real world entity to enable user 102 to view the virtual entity image in place of the real world entity. In such case, the position of the real world entity may need to be determined and/or tracked, so that wearable device 104 can maintain the virtual entity image in position on lens 512 to conceal the real world entity. In such case, position information regarding a real-world entity may be determined, and image information regarding a virtual entity may be processed based on that determined position information. For instance, FIG. 11 shows a flowchart 1100 providing a process for processing position information regarding a real-world entity, according to an example embodiment of the present invention. Flowchart 1100 is described as follows.

Flowchart 1100 begins with step 1102. In step 1102, at least one of a location of the second entity, an orientation of the second entity, or a speed at which the second entity is moving is determined. The second entity may be a real-world entity, such as entity 302 shown in FIG. 3. A location, orientation, and/or speed of the second entity may be determined in any suitable manner, including using image recognition, tracking the second entity with a radio frequency identification (RFID) device (e.g., tag) attached to the second entity, and/or using other techniques. For example, a wearable device may include a camera (for image recognition) and/or a RFID reader (to track a RFID device). Step 1102 may be performed during step 902 of flowchart 900 shown in FIG. 9, for example.

In step 1104, the image information representative of the first entity is processed based on the determined at least one of the location of the second entity, the orientation of the second entity, or the speed at which the second entity is moving. Image information received from entity information storage 504 regarding the first entity (the entity to be displayed as a virtual entity image (e.g., entity image 516)), may be processed based on the determined location, orientation, and/or speed of the second entity (the real world entity). As described above, the distance between the location of wearable device 500 and the virtual location of the virtual entity (e.g., the location of the real-world entity), the larger will be the image of the virtual entity generated for display by entity information processor 508. Such distance may change as the position of the real world entity changes, at a rate of speed of movement of the real-world entity. Entity image processor 508 may scale the size of the virtual entity generated for display based upon the distance. Furthermore, as the orientation of the real world entity changes, the orientation of the virtual entity may need to be changed. The orientation of the virtual entity image displayed in lens 512 may be modified by entity image processor 508. Step 1104 may be performed during step 904 of flowchart 900 shown in FIG. 9, for example.

FIG. 12 shows a flowchart 1200 that is an example of flowchart 1100 shown in FIG. 11, according to an embodiment of the present invention. Flowchart 1200 is described with respect to a wearable device 1300 shown in FIG. 13. Wearable device 1300 is an example of wearable device 104 shown in FIG. 1, according to an embodiment of the present invention. Flowchart 1200 is described as follows.

Figure 13:
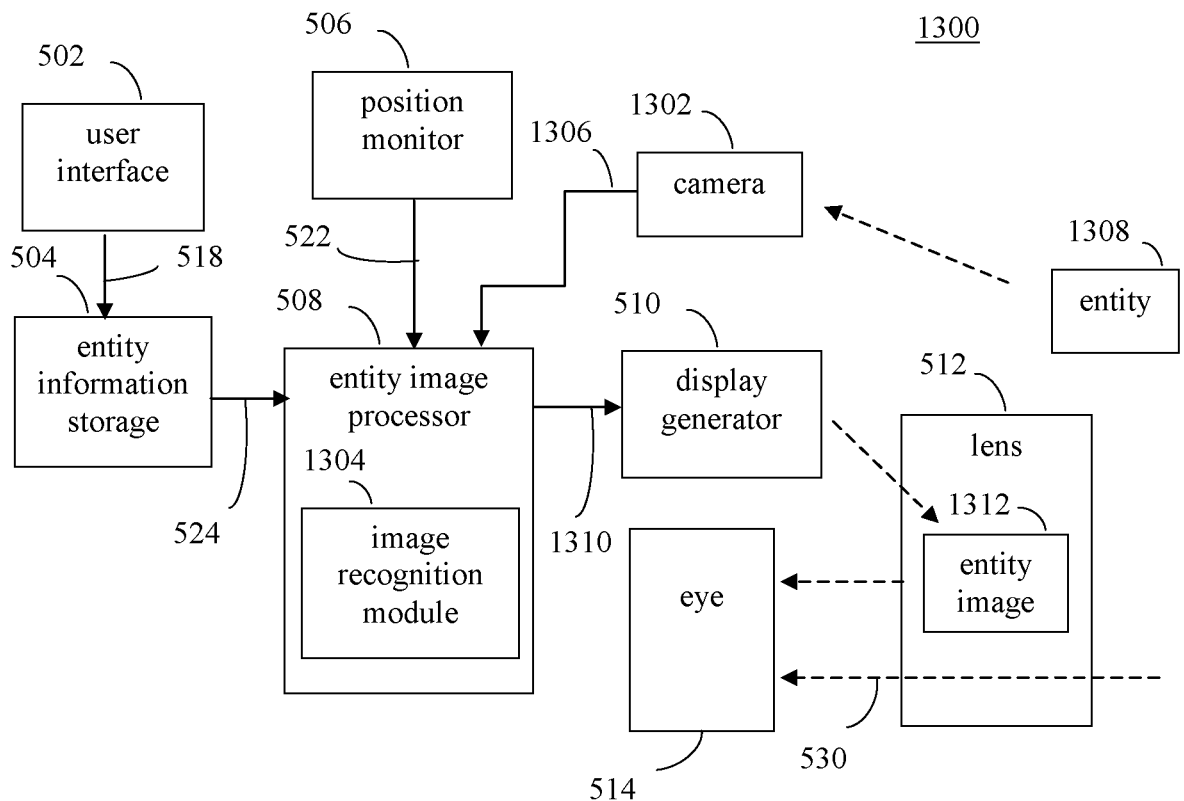
FIG. 13 shows an example wearable device that includes a camera, according to an embodiment of the present invention

In step 1202, an image of the second entity is captured. Wearable device 1300 shown in FIG. 13 is generally similar to wearable device 500 shown in FIG. 5, with differences described as follows. As shown in FIG. 13, wearable device 1300 includes a camera 1302. Camera 1302 is configured to capture an image of an environment viewable by user 102, including capturing an image of a real-world entity 1308. Camera 1302 may be any type of suitable image capturing device mountable in wearable device 1300, as would be known to persons skilled in the relevant art(s). For example, camera 1302 may include an image sensor, such as a charge coupled device (CCD) or a CMOS (complementary metal-oxide-semiconductor) sensor. As shown in FIG. 13, camera 1302 generates a captured image information signal 1306. Step 1202 may be performed during step 1102 of flowchart 1100 shown in FIG. 11, for instance.

In step 1204, the captured image is processed to determine a location of the second entity. For instance, as shown in FIG. 13, entity image processor 508 includes an image recognition module 1304. Entity image processor 508 receives captured image information signal 1306. Image recognition module 1304 processes captured image information signal 1306 to identify real-world entity 1308 in the captured image, and to determine a location of real-world entity 1308 in the local environment. Image recognition module 1304 may use any suitable pattern/image recognition techniques known to persons skilled in the relevant art(s). For example, pose estimation techniques may be performed by image recognition module 1304 on captured image information signal 1306 to estimate a position and/or orientation of real world entity 1308 relative to camera 1302. Entity image processor 508 generates processed image information signal 1310, which includes the image information regarding the virtual entity received in virtual entity image information 524 processed according to the determined position and/or orientation of real-world entity 1308. Step 1204 may be performed during step 1104 of flowchart 1100 shown in FIG. 11, for instance.

Figure 14:
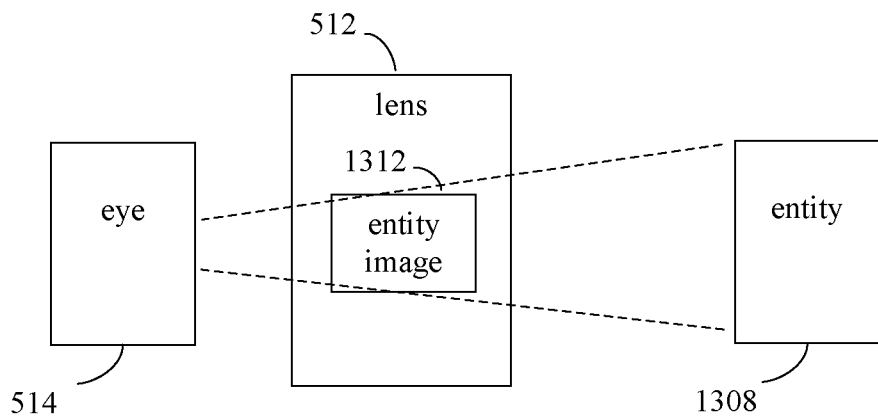
FIG. 14 shows a block diagram of an entity image optically aligned between an eye of a user and a real-world entity, according to an example embodiment of the present invention.

In step 1206, the image of the first entity on the lens is optically aligned with the second entity visible through the lens to at least partially conceal the second entity to the user of the wearable device. For instance, display generator 510 receives processed image information signal 1310, and generates an entity image 1312 at lens 512, which is representative of the virtual entity selected to replace entity 1308 in the viewable environment of user 102. Entity image 1312 is positioned at lens 512 to conceal entity 1308 from the view of user 102. For example, FIG. 14 shows a block diagram representation of entity image 1312 optically aligned on lens 512 between eye 514 of user 102 and real-world entity 1308. Entity image 1312 is sized and positioned to substantially conceal real-world entity 1308 with respect to eye 514. As described above, entity image 1312 may be focused by display generator 510 to appear at the distance of entity 1308 from wearable device 1300.

Note that in an embodiment, a pair of cameras 1302 may be included in wearable device 1300. For example, wearable device 1000 shown in FIG. 10 may include a first camera 1302a associated with right eye 514a and a second camera 1302b associated with left eye 514b. Right image processor 1002a may include a first image recognition module 1304a configured to process a captured image information signal 1306a generated by first camera 1302a, to generate a processed image information signal 1310a. Left image processor at 1002b may include a second image recognition module 1304b (or may use the same image recognition module 1304) configured to process captured image information signal 1306b generated by second camera 1302b, to generate a processed image information signal 1310b. Right display generator 510a may receive processed image information signal 1310a, and may generate a corresponding right entity image 1312a in optical alignment with right eye 514a and entity 1308. Left display generator 510b may receive processed image information signal 1310b, and may generate a corresponding left entity image 1312b in optical alignment with left eye 514b and entity image 1308. In this manner, user 102 may be presented with a stereoscopic view of entity image 1312 that conceals real world entity 1308.

As shown in FIGS. 5, 10, and 13, wearable devices may be configured to be self-contained. In further embodiments, wearable devices, including the wearable devices shown in FIGS. 5, 10, and 13, may be configured as not self-contained. In such embodiments, a first set of the elements described above may be included in a wearable device and a second set of the elements described above may be separate from the wearable device.

Figure 15:
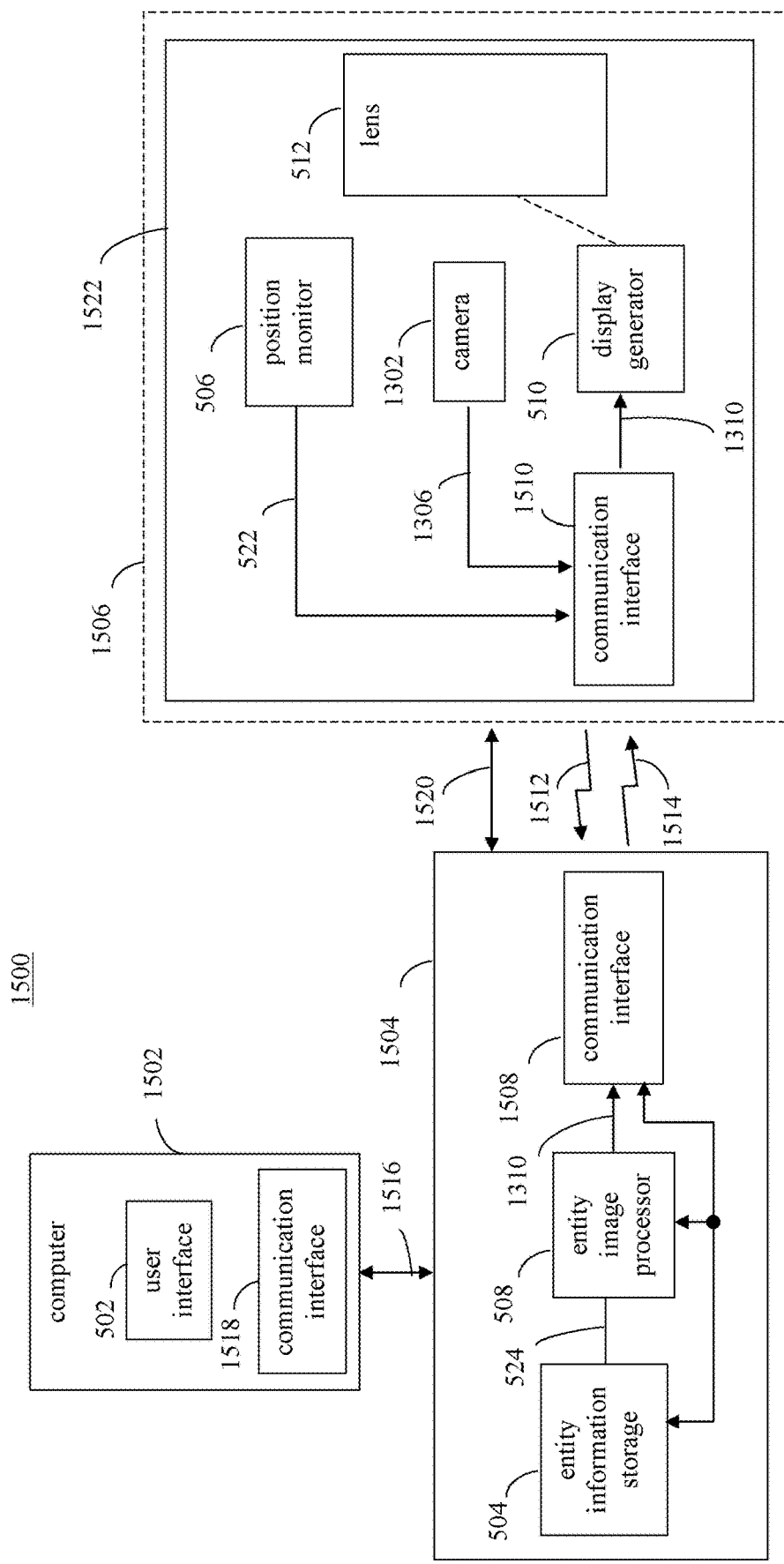
FIG. 15 shows a block diagram of a reality overlay system, according to an example embodiment of the present invention.

For instance, FIG. 15 shows a block diagram of a reality overlay system 1500, according to an example embodiment of the present invention. As shown in FIG. 15, system 1500 includes a computer 1502, a reality overlay server 1504, and a wearable device 1506. Computer 1502 includes user interface 502 and a communication interface 1518. Reality overlay server 1504 includes entity information storage 504, entity image processor 508, and a communication interface 1508. As shown in FIG. 15, communication interface 1508, entity image processor 508, and entity information storage 504 are coupled together in server 1504 by a communication signal/bus. Wearable device 1506 includes position monitor 506, camera 1302 (when present), display generator 510, lens 512, a communication interface 1510, and a body 1522. Body 1522 includes (e.g., mounts and/or contains) position monitor 506, camera 1302 (when present), display generator 510, lens 512, and communication interface 1510.

Computer 1502 and reality overlay server 1504 communicate over a communication link 1516. Communication interface 1518 of computer 1502 may transmit signals that are received by communication interface 1508 of reality overlay server 1504, and communication interface 1508 may transmit signals that are received by communication interface 1518. For instance, as described above, communications regarding selecting and configuring virtual entities (e.g., virtual entity configuration information 518 exchanged between user interface 502 and entity information storage 504) may occur over communication link 1516 between communication interfaces 1508 and 1518.

Reality overlay server 1504 and wearable device 1506 communicate over a communication link 1520. Communication interface 1508 of reality overlay server 1504 may transmit signals that are received by communication interface 1510 of wearable device 1506, and communication interface 1510 may transmit signals that are received by communication interface 1508. For instance, as shown in FIG. 15, communication interface 1510 may receive position information signal 522 and captured image information signal 1306, and transmit the corresponding position and captured image information from wearable device 1506 to communication interface 1508 at reality overlay server 1504 in a first communication signal 1512. Communication interface 1508 may receive first communication signal 1512, and may provide the associated position and captured image information to entity image processor 508. Entity image processor 508 may also receive virtual entity image information 524 from entity information storage 504, and may generate processed image information signal 1310. Communication interface 1508 may receive and transmit processed image information signal 1310 from server 1504 to communication interface 1510 at wearable device 1506 in a second communication signal 1514. Communication interface 1510 may receive second communication signal 1514, and may transmit processed image information signal 1310 to display generator 510. Display generator 510 may generate a virtual entity image at lens 512 based upon processed image information signal 1310, as described above.

Communication links 1516 and 1520 may be wired and/or wireless links, such as an IEEE 802.11 wireless LAN (WLAN) wireless link, a Worldwide Interoperability for Microwave Access (Wi-MAX) wireless link, an Ethernet interface, a Universal Serial Bus (USB), etc. For example, communication links 1516 and/or 1520 may include a local area network (LAN), a wide area network (WAN), a personal area network (PAN), or a combination of networks, such as the Internet. Communication interfaces 1508, 1510, and 1518 may be any type of communication/network interfaces (e.g., network interface card (NIC)), wired or wireless, such as an as IEEE 802.11 WLAN wireless interface, a Wi-MAX interface, an Ethernet interface, a Universal Serial Bus (USB) interface, etc.

In an embodiment where communication link 1520 includes a wireless link, wearable device 1506 may be wirelessly worn by user 102 without the hassles of a communication wire being attached to wearable device 1506. In the embodiment of FIG. 15, position information collection is performed in wearable device 1506 (e.g., by position monitor 506 and camera 1302), and image processing is performed in server 1504. It is noted that 1500 is provided for illustrative purposes, and is not intended to be limiting. The elements of computer 1502, server 1504, and wearable device 1506 shown in FIG. 15 may be redistributed between computer 1502, server 1504, and wearable device 1506 in other ways, including between additional or fewer devices, as would be understood to persons skilled in the relevant art(s) based on the teachings provided herein.

Figure 16:
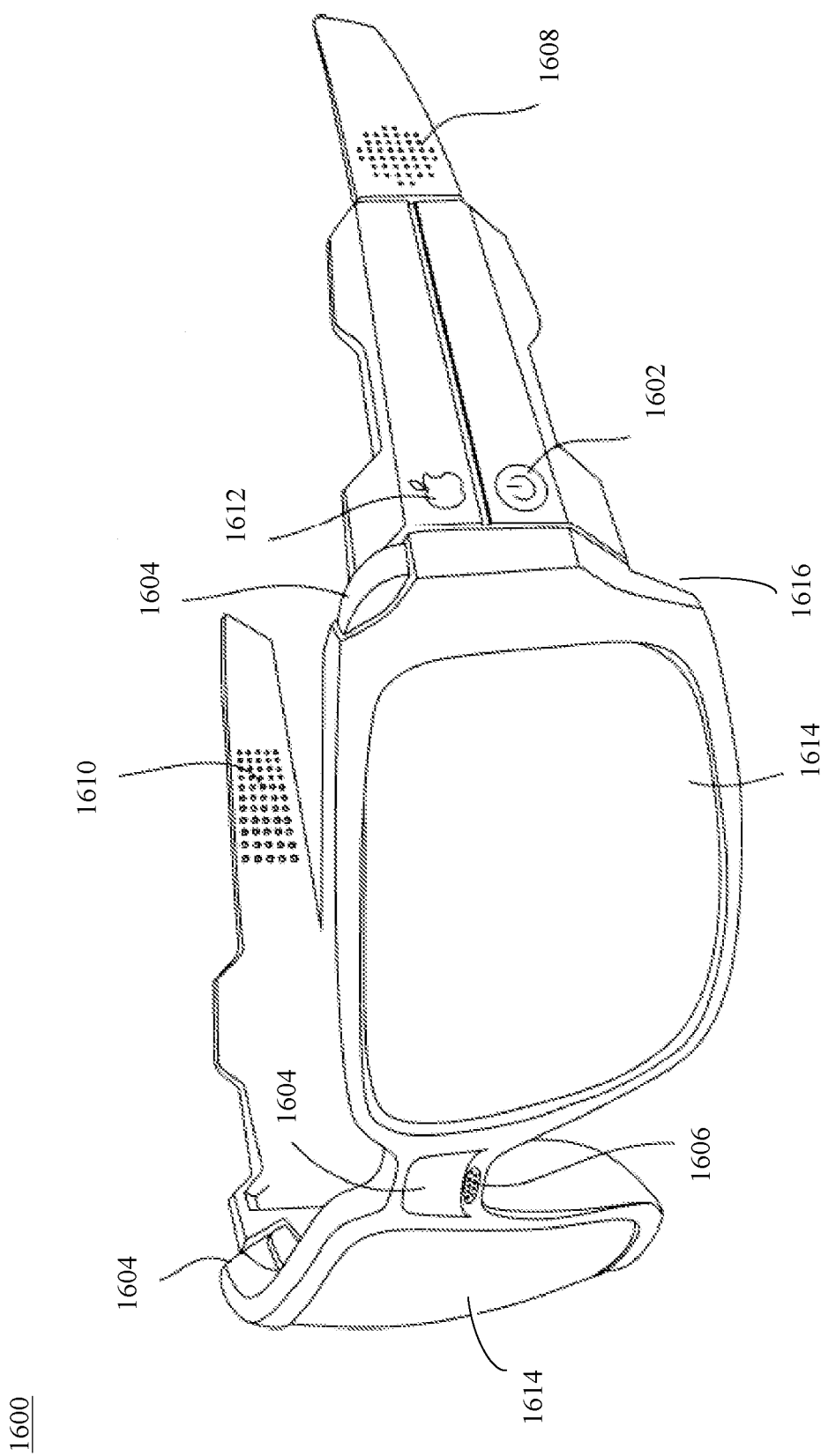
FIG. 16 shows a wearable device, according to an example embodiment of the present invention.

Body 1522 of wearable device 1506 may have various form factors, including the form of glasses, goggles, a mask, or other suitable form factor. For instance, FIG. 16 shows a wearable device 1600, according to an example embodiment of the present invention. Wearable device 1600 is still another example of wearable device 104 shown in FIG. 1. As shown in FIG. 16, wearable device 1600 includes a start button 1602, a plurality of sensors 1604, a microphone 1606, a pair of sound captors 6008, a set of headphones 1610, a visual indicator 1612, a pair of transparent lenses 1614, and a body 1616. As shown in FIG. 16, body 1616 is shaped as a pair of glasses or goggles. Body 1616 may be modified to further prevent light from reaching the eyes of the user from around body 1616. For example, a flexible extended lip may be provided around each lens 1614 to conform closely to the face of the user. An example of wearable device 1600 is described in co-pending U.S. patent application Ser. No. 12/125,877, titled "Reality Overlay Device," filed on May 22, 2008, which is incorporated by reference herein in its entirety. Wearable device 1600 is further described as follows.

As shown in FIG. 16, lenses 1614 enable a user to view his or her surroundings through lenses 1614. Lenses 1614 may function as screens that enable a non-transparent reality overlay to be displayed to the user, as described above. In embodiments, each of the lenses 1614 may include a liquid crystal display (LCD) or a display projector.

Wearable device 1600 may support connection to a wireless network such as a cell phone network, localized Bluetooth devices, Worldwide Interoperability for Microwave Access (Wi-MAX) and Wireless Fidelity (Wi-Fi), as described above. In addition, wearable device 1600 may support further communication mechanisms such as Universal Serial Bus (USB), etc. Start button 1602 may enable the user to turn wearable device 1600 on (or off). In one embodiment, when wearable device 1600 is off, wearable device 1600 may be used as a pair of sunglasses. When wearable device 1600 is on, wearable device 1600 may receive and capture information that is pertinent to physical surroundings with respect to wearable device 1600, enabling a reality overlay to be generated in the form of one or virtual entity images, as described above. For instance, the information that is captured may include position, visual, and/or audio information.

The visual information may be captured via one or more visual inputs such as visual sensors 1604, which may each be camera 1302 shown in FIG. 13, for example. For instance, each of visual sensors 1604 may be a still or video camera that is capable of capturing one or more still images or video images, respectively. These images may be captured in two-dimensional form or three-dimensional form. In one embodiment, visual sensors 1604 may include two sensors, where one of the sensors 1604 is positioned at the left side of the lenses 1614 of wearable device 1600 and another one of the sensors 1604 is positioned at the right side of the lenses 1614 of wearable device 1600. For instance, the sensors 1604 may be placed near the hinges of wearable device 1600, as shown in FIG. 16. In this manner, the two sensors 1604 may capture images that would be viewed by a user's left and right eyes. The images captured via the two sensors 1604 may be combined to replicate a single image that would be perceived by a user viewing the two separate images through the two different lenses 1614. The visual sensors 1604 may further include a third sensor at the center of the lenses 1614 of wearable device 1600.

Audio information may be captured via one or more audio sensors. For instance, the audio sensors may include one or more microphones. As shown in this example, one or more microphones 1606 may be provided on the bridge of wearable device 1600 for purposes of capturing voice commands from a user of wearable device 1600 and/or for capturing surrounding sounds. In an embodiment, wearable device 1600 may also support voice recognition to assist in capturing voice commands. The audio sensors may also include one or more sound captors (e.g., microphones) 1608 at various locations on wearable device 1600. In the example of FIG. 16, sound captors 1608 include two separate sound captors, where each of the sound captors is positioned on the external side of one of the arms of wearable device 1600. Sound captors 1608 may function to receive sounds from the surroundings (e.g., rather than from the user of the device).

As described above, wearable device 1600 may also include position monitor 506 configured to determine information such as a location of wearable device 1600 (e.g., coordinates of the device), an orientation of wearable device 1600, or a speed with which wearable device 1600 is moving. For example, wearable device 1600 may include a global positioning system (GPS) device to enable coordinates of wearable device 1600 to be determined. As another example, wearable device 1600 may include one or more gyroscopes that may be used to determine an orientation of wearable device 1600. As yet another example, wearable device 1600 may include an accelerometer that may be used to determine an orientation and/or speed with which wearable device 1600 is traveling.

Other information that may be captured by the device may include identifying one or more entities in the field of vision of wearable device 1600. For instance, wearable device 1600 may support pattern recognition by including or accessing image recognition module 1304 shown in FIG. 13. Thus, wearable device 1600 may process at least a portion of the received information (e.g., one or more images) in order to identify one or more entities using pattern recognition. Such entities may include environmental features such as a mountain, a road, a building, a sidewalk, and/or other fixed position entities. Moreover, entities that are recognized may also include people, animals, vehicles, and/or other mobile entities. Pattern recognition may also be used to identify specific buildings by identifying letters, words, or addresses posted in association with a particular building. In addition, the device may enable entities to be recognized by a Radio Frequency Identification (RFID) or similar hardware tag. Similarly, entities may be recognized using the location of wearable device 1600 and orientation of wearable device 1600.

Wearable device 1600 may obtain virtual entity overlay information for use in generating and providing a non-transparent overlay of a virtual entity image and/or audio overlay using at least a portion of the information that wearable device 1600 has captured. The virtual entity in which information may be obtained at entity image storage 504 locally (e.g., from one or more local memories and/or processors) or remotely. For instance, virtual entity image information may be obtained remotely from one or more servers using an Internet browser via a wireless connection to the Internet, as described above. Wearable device 1600 or a remotely located server may identify one or more entities in the information that wearable device 1600 has captured. This may be accomplished by accessing a map of the location in which wearable device 1600 is being used, using RFID, and/or by using pattern recognition, as set forth above. Information that is pertinent to the identified entities may then be obtained.

The virtual entity image information may also specify placement of a virtual entity with respect to real world entities. For example, the location of an entity in the visual information may be used to determine an optimum placement of the virtual entity image at lenses 1614. For example, where a real-world entity is a restaurant, the virtual entity image information associated with the restaurant may be positioned immediately next to or in front of the restaurant.

Similarly, in accordance with various embodiments, audio overlay information may be provided via one or more audio outputs (e.g., speakers) of wearable device 1600. In this example, wearable device 1600 includes a headphone 1610 that includes a speaker on the internal side of both the left and right arms of wearable device 1600. In this manner, a user may receive audio overlay information such as directions a voice or sounds made by a virtual entity displayed at lenses 1614.

Wearable device 1600 may further include visual indicator 1612 configured to signal whether wearable device 1600 is online or offline. Visual indicator 1612 may also be used to indicate whether the user is on a wireless call.

The identity of the user of wearable device 1600 may be ascertained and used in various embodiments in order to tailor the operation of wearable device 1600 to preferences of the user. An identity of the user (e.g., owner) of wearable device 1600 may be statically configured. Thus, wearable device 1600 may be keyed to an owner or multiple owners. In some embodiments, wearable device 1600 may automatically determine the identity of the user (e.g., wearer) of wearable device 1600. For instance, a user of the device may be identified by deoxyribonucleic acid (DNA) and/or retina scan.

It is important to note that wearable device 1600 shown and described with reference to FIG. 16 is provided for illustrative purposes, and therefore wearable device 1600 may be implemented in different forms. Moreover, wearable device 1600 may support some or all of the above listed features, as well as additional features not set forth herein.

B. Example Wearable Reality Overlay Device Application Embodiments

Figure 17:
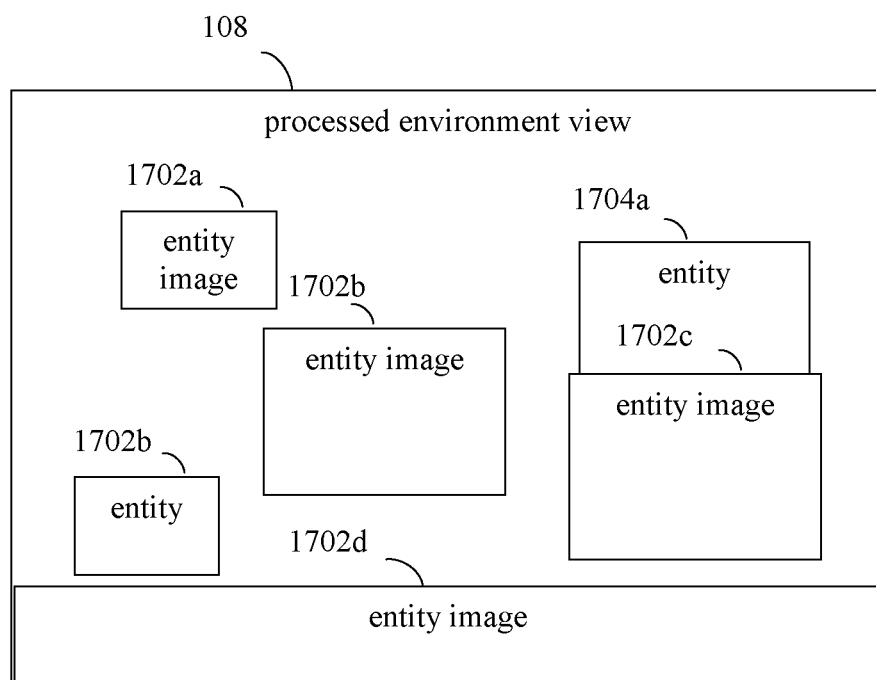
FIG. 17 shows a block diagram of a viewable environment where a variety of virtual entity images and real world entities are viewable by a user of a wearable device, according to example embodiment of present invention.

The wearable devices described herein may be used in a variety of applications, and may be used to display any number of virtual entities with respect to any number of real world entities in a viewable environment. For example, FIG. 17 shows a block diagram of processed environment view 108 provided by wearable device 104, where a variety of virtual entity images 1702 and real world entities 1704 are viewable by user 102 of wearable device 104. Virtual entity images 1702 are generated for display at the lenses of wearable device 104 so that their corresponding virtual entities appear to be present to user 102. In some cases, virtual entity images 1702 may be configured to partially or entirely conceal one or more real world entities 1704 from the view of user 102.

For instance, user 102 may desire to simulate a trip to another place (e.g., an interstellar location), with a friend. Wearable device 104 may be configured to generate various virtual entity images that combine with real world entities to generate a virtual view of the other place to user 102. For example, a virtual entity image 1702*a* (e.g., the planet Mars) is generated to be visible to user 102. A virtual entity image 1702*b* (e.g., a spaceship) is generated to be visible to user 102 that entirely conceals a real-world entity (e.g., a car) from the view of user 102. A portion of a real-world entity 1704*a* (e.g., a friend of user 102) is visible to user 102. A virtual entity image 1702*c* (e.g., a spacesuit) is generated to be visible to user 102, and partially conceals real-world entity 1704*b* from the view of user 102. A real-world entity 1702*b* (e.g., user 102's dog) is visible to user 102. A virtual entity image 1702*d* (e.g., the lunar landscape) is generated to be visible to user 102 that entirely conceals a real world entity (e.g., the ground of the local environment) from user 102.

This description of processed environment view 108 generated by wearable device 104 with respect to FIG. 17 is provided for illustrative purposes, and is not intended to be limiting. Any number of virtual entities and/or any type of virtual environment may be generated by wearable device 104 to be overlaid over a real-world environment. Further example embodiments of the present invention include:

1. Creation of monetizable virtual entities: As wearable reality overlay devices become prevalent in the marketplace, individuals and/or companies that generate and/or sell virtual entities, including any virtual entities described elsewhere herein (virtual clothing, toys, pets, objects, etc.), may be able to generate income based on the sales.

2. Locking the appearance of persons: As described herein, wearable reality overlay devices enable the appearance of others to be modified. Persons may desire to lock their appearance to a particular selected appearance, so that their appearance in other users' wearable devices will always appear the same. For instance, a user may have a full body, three-dimensional scan of their body performed. The full body scan may be uploaded into storage (e.g., in entity information storage 504), and may be available at a central server (e.g., server 1504 shown in FIG. 15) to be accessed by various wearable devices. The stored full body scan is a canonical source of imagery for any other user having a wearable reality overlay device that views the user. In addition, a user can optionally configure clothing patterns for their self and others to view using a wearable device.

3. Maintaining the appearance of entities: In a world where wearable reality overlay devices are prevalent, because the "real world" can be re-skinned in the view of users, real world entities in physical space may fall into disrepair. The virtual appearance of decaying real world entities such as furniture, buildings, clothing, etc., can continue to appear well-maintained using wearable reality overlay devices. Furthermore, such real world entities can be revised and/or upgraded by overlaying virtual entities on the real world entities that are revised virtual and/or upgraded versions. For example, instead of purchasing a new real world dresser for an old dresser, the old dresser could be made to virtually appear in new shape or as a different style of dresser, such as a colonial or mid-century dresser to users of wearable devices.

4. Example application—living in another era: a user who has a penchant for nostalgia can substitute reality with an earlier era by "re-skinning" the real-world entities around them with virtual versions of the real-world entities from an earlier era.

5. Example application—living in an alternative city: a user can re-skin entities present in their current city so it appears to be a different city. For example, a San Francisco resident who just travelled to Paris may wish to re-skin San Francisco with Parisian themed virtual entities.

6. Example application—adding life caching: Virtual entities representative of absent or dead relatives can be added to the field of view of a user of a wearable reality overlay device. Artificial intelligence (AI) technologies can be used to simulate the actions of such virtual persons as viewed in a wearable device if such persons can be "life cached." A user may be enabled to have a conversation with a virtual representation of a dead, famous, absent or other person, based on their cached life.

7. Example application—games: Users of wearable devices can insert themselves into games having a virtual gaming environment (e.g., a virtual game field of play), virtual competitors and/or teammates, virtual game implements (e.g., virtual game balls, rackets, bats, gloves, guns, etc.), that are displayed alongside real-world components of the games, including real-world game field features, real-world persons that are teammates or competitors, real world game implements, etc. The following subsection describes some example wearable reality overlay device embodiments in a gaming environment.

C. Example Wearable Reality Overlay Device Gaming Embodiments

In embodiments, wearable reality overlay devices are configured to enable reality and virtual aspects to be presented together to manipulate reality for gaming purposes. Examples of such embodiment are described in the present subsection. The example embodiments described herein are provided for illustrative purposes, and are not limiting. Further structural and operational embodiments, including modifications/alterations, will become apparent to persons skilled in the relevant art(s) from the teachings herein.

Figure 18:
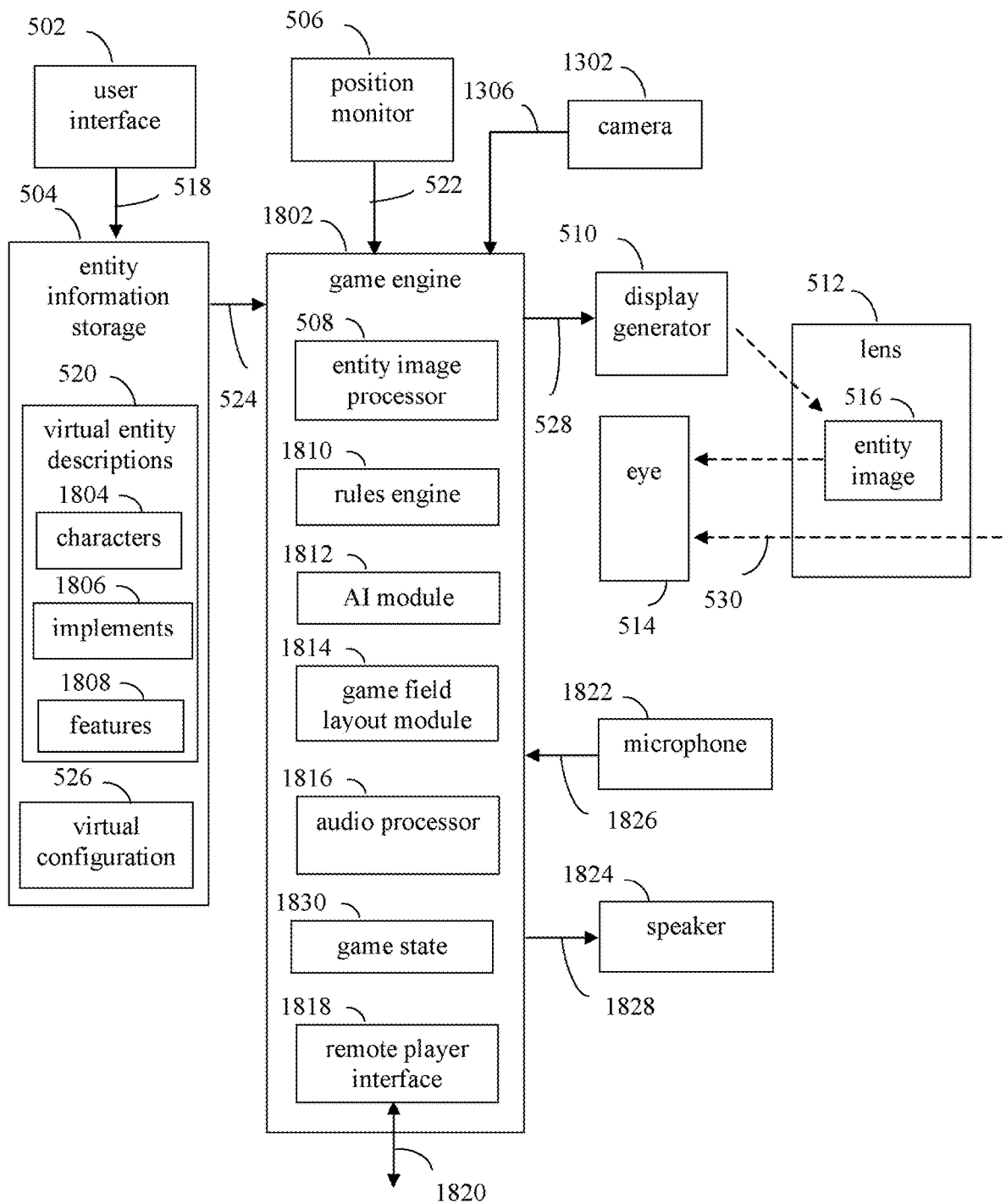
FIG. 18 shows a block diagram of an example wearable reality overlay device, according to an embodiment of the present invention.

FIG. 18 shows a block diagram of an example wearable reality overlay device 1800 (hereinafter "wearable device 1800"), according to an embodiment of the present invention. Wearable device 1800 is an example of wearable device 104 shown in FIG. 1. As shown in FIG. 18, wearable device 1800 includes user interface 502, entity information storage 504, position monitor 506, display generator 510, lens 512, a game engine 1802, a microphone 1822, and a speaker 1824. Game engine 1802 includes entity image processor 508, a rules engine 1810, an AI module 1812, a game field layout module 1814, an audio processor 1816, and a remote player interface 1818. As shown in FIG. 18, wearable device 500 interacts with eye 514, which may be an eye of user 102 shown in FIG. 1, for example.

The elements of wearable device 1800 shown in FIG. 18 may be included in a self-contained wearable device, or may be included in different devices (e.g., as shown in FIG. 15, where computer 1502, server 1504, and wearable device 1506 each include respective elements). For example, game engine 1802 may be included in a server that is accessible by one or more wearable devices, including wearable device 1800. Furthermore, wearable device 1800 may include dual image processing (e.g., generating virtual images for a pair of lenses as shown in FIG. 10) and/or dual audio processing (e.g., receiving sound at right and left microphones 1822, and generating sound at right and left speakers 1824).

Figure 19:
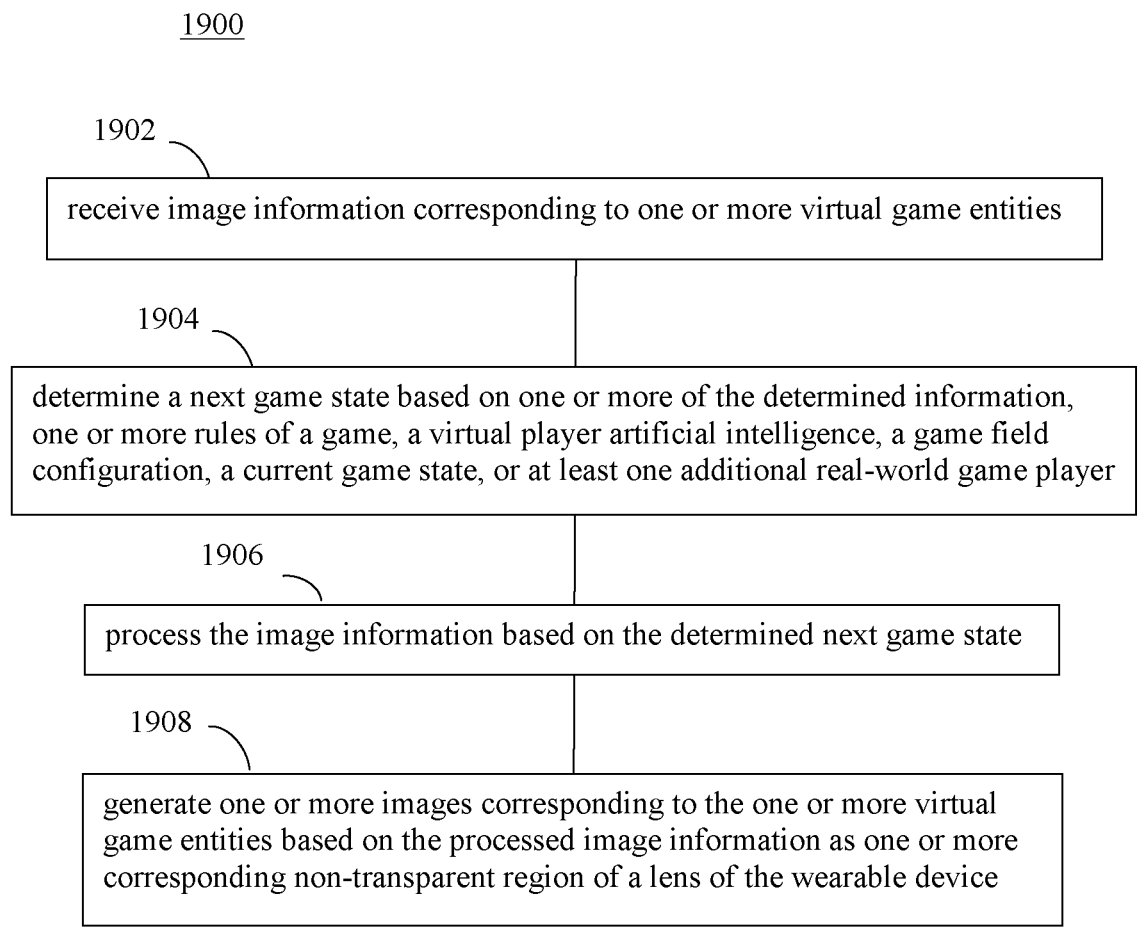
FIG. 19 shows a flowchart for performing reality overlay in a gaming environment, according to an example embodiment of the present invention.

Wearable device 1800 is generally similar to the wearable devices described above, with differences described as follows. Wearable device 1800 is described below with respect to FIG. 19. FIG. 19 shows a flowchart 1900 for reality overlay in a gaming environment, according to an example embodiment of the present invention. For example, the steps of flowchart 1900 may be integrated in flowchart 900 shown in FIG. 9. Flowchart 1900 may be performed by wearable device 1800, for example. Wearable device 1800 and flowchart 1900 are described as follows.

In step 1902, image information corresponding to one or more virtual game entities is received. As shown in FIG. 18, virtual entity descriptions 520 stored in entity information storage 504 include various game related virtual entity descriptions, such as characters 1804, implements 1806, and features 1808. The characters 1804, implements 1806, and features 1808 descriptions may be received at entity image processor 508 in game engine 1802 from entity information storage 504 in virtual entity image information 524.

Characters 1804 may include graphical information necessary for graphical rendering of an image of the one or more virtual characters of a game served by game engine 1802. Characters 1804 may also include game parameters related to the corresponding virtual characters, including artificial intelligence characteristics and sound characteristics. The graphical information may include information for rendering virtual characters in two or three dimensions, depending on the particular character and/or game. Examples of virtual characters that may have descriptors included in characters 1804 include opponents and/or teammates of a user of wearable device 1800, and may include virtual characters such as virtual animals, people (e.g., celebrities, athletes, famous people, historical figures, friends, relatives, etc.), video game characters, monsters, cartoon characters, and other virtual characters.

Implements 1806 may include graphical information necessary for graphical rendering of an image of the one or more virtual implements of a game served by game engine 1802. The graphical information may include information for rendering virtual implements in two or three dimensions, depending on the particular implement and/or game. Examples of virtual implements that may have descriptors included in implements 1806 include virtual game balls (e.g., virtual baseballs, golf balls, soccer balls, footballs, basketballs, tennis balls, ping-pong balls, racquet balls, etc.), rackets, bats, firearms, other weapons, vehicles, musical instruments, and other virtual implements.

Features 1808 may include graphical information necessary for graphical rendering of an image of the one or more virtual features of a game served by game engine 1802. The graphical information may include information for rendering virtual features in two or three dimensions, depending on the particular feature and/or game. Examples of virtual features that may have descriptions included in features 1808 include virtual game fields (e.g., turf, grass, hard court, field markers, a battlefield, etc.), trees, dwellings, mountains, goals, goalposts, targets, nets (e.g., a tennis net, a basketball net, etc.), and other virtual features.

In step 1904, a next game state is determined based on one or more of the determined information, one or more rules of a game, a virtual player artificial intelligence, a game field configuration, a current game state, or at least one additional real-world game player. Game engine 1802 may be configured to perform step 1904. Game engine 1802 may maintain a game state 1830. Based upon the maintained game state 1830, game engine 1802 may determine a next game state 1830. One or more of rules engine 1810, AI module 1812, game field layout module 1814, and audio processor 1816 of game engine 1802 may be present to process corresponding received information and/or information related to game state 1830 to generate a next game state 1830.

For example, rules engine 1810 may be configured to process game physics according to the particular rules of the game, which may be a sport (e.g., basketball, football, baseball, tennis, ping-pong, swimming, track, soccer, etc.), an arcade game, a simulation game (e.g., military, medieval, outer space, etc.), or other type of game. Rules engine 1810 may be configured to process movements of real world players, including movements of user 102, movements of virtual implements of the game according to the particular rules of the game to generate updated positions for virtual game entities.

AI module 1812 may be configured to handle the artificial intelligence of virtual characters of the game. For example, AI 1812 may be configured to determine actions of opponents and/or teammates of the user in the game. Based upon the maintained game state 1830, AI module 1812 may determine the next actions of the virtual characters to be included in the next game state 1830.

Game field layout module 1814 may be configured to maintain a layout of the various features of the game relative to motions of wearable device 1802. For example, game field layout module 1814 may be configured to maintain the positions of features such as those described above with respect to features 1808, as the game progresses from the current game state 1830 to a next game state 1830.

Audio processor 1816, microphone 1822, and/or speaker 1824 may each be optionally present. Audio processor 1816 may be configured to receive a voice input 1826 of user 102 received at microphone 1822, and to analyze voice input 1826 for instructions provided by user 102. Determined instructions may be provided to rules engine 1810 to be processed with respect to the rules of the game, to AI module 1812 to be processed as instructions to virtual characters of the game, and/or to be communicated to remote real-world persons participating in the game (e.g., over a communication link 1820). Audio processor 1816 may also generate sound information 1828 to be broadcast by speaker 1824 to user 102. The broadcast of sound information 1828 may include voice communications from virtual characters and/or from remote real-world persons participating in the game, and/or may include sound effects of the game.

Remote player interface 1818 provides an interface between game engine 1802 and other persons participating in the game. Remote player interface 1818 is configured to communicate over a communication link 1820 with remote wearable devices and/or other electronic devices associated with the remote players. In an embodiment where game engine 1802 is separate (e.g., located in a separate server) from wearable device 1800, communications of camera 1302, display generator 510, microphone 1822, and speaker 1824 may occur from wearable device 1800 over communication link 1820 two game engine 1802 rather than directly to game engine 1802 as shown in FIG. 18. Remote player interface 1818 may include any suitable communication interface described elsewhere herein or otherwise known.

In step 1906, the image information is processed based on the determined next game state 1830. Entity image processor 508 is configured to process the image information corresponding to the virtual game entities received in virtual entity image information 524 based on the next game state 1830 determined by game engine 1802 to generate processed image information signal 528. Processed image information signal 528 may include processed image information corresponding to any number of virtual entities of the game including virtual characters, virtual features, and virtual implements of the game. Step 1906 may be performed during step 904 of flowchart 900 shown in FIG. 9, for example.

In step 1908, one or more images corresponding to the one or more virtual game entities are generated based on the processed image information as one or more corresponding non-transparent region of a lens of the wearable device. As shown in FIG. 18, display generator 510 receives processed image information signal 528, and is configured to generate one or more entity images 516 at lens 512 as non-transparent regions. The one or more entity images 516 correspond to virtual entities of the game. The non-transparent regions enable the one or more virtual entities to appear to be present in the environment to user 102 of wearable device 1800.

Figure 20:
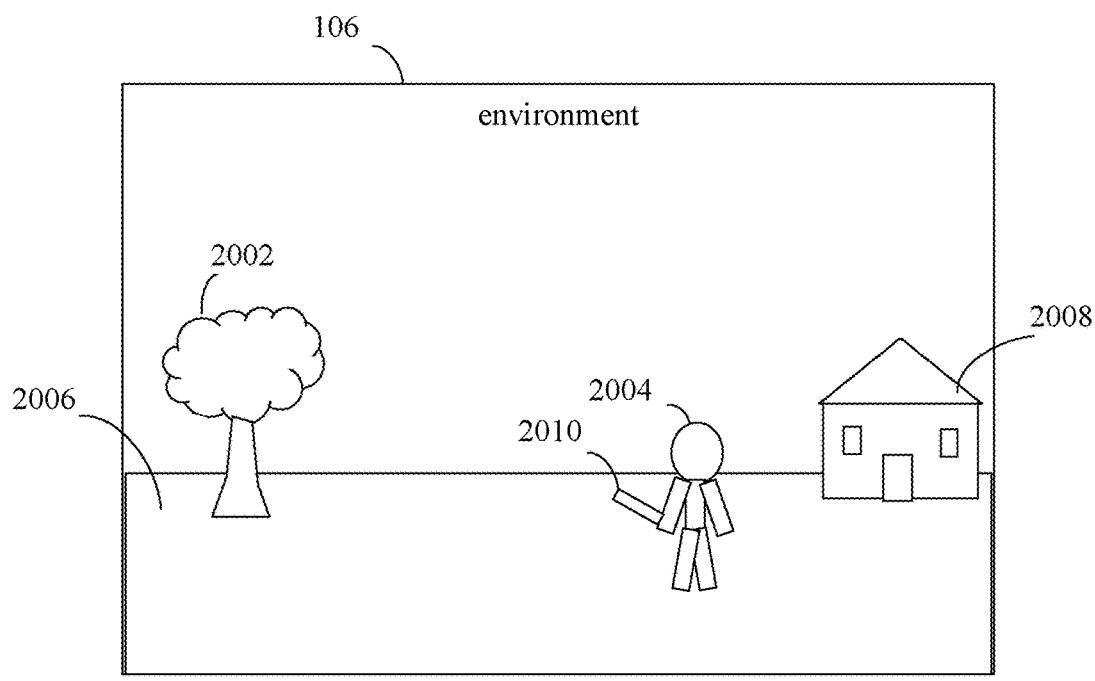
FIG. 20 shows an example of an environment viewable to a user when a wearable device is not activated.

For example, FIG. 20 shows an example of environment 106 viewable to user 102 when wearable device 1800 is not present or activated. As shown in FIG. 20, environment 106 includes a tree 2002, a real-world game participant 2004, a lot 2006, a house 2008, and a handheld game controller 2010. When user 102 is wearing wearable device 1800, and has activated a game of lacrosse, a processed environment view 108 shown in FIG. 21 may be provided to user 102 through wearable device 1800, in an example embodiment. Virtual entities in processed environment view 108 may be generated by wearable device 1800 that interact in the game of lacrosse with user 102 according to game engine 1802.

Figure 21:
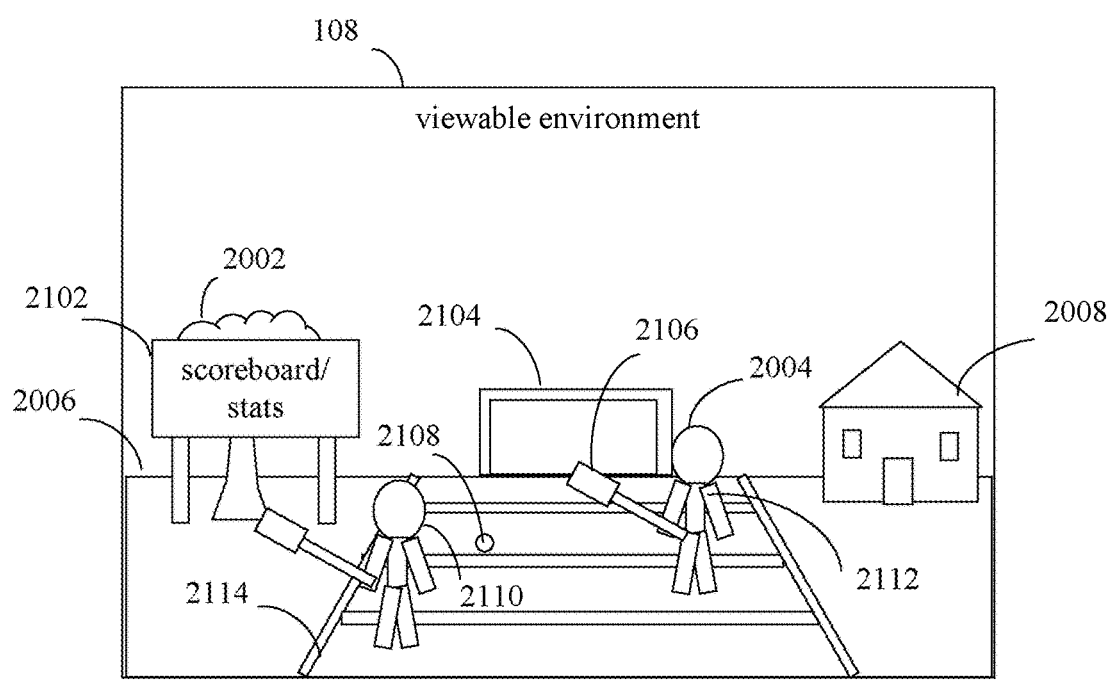
FIG. 21 shows the environment of FIG. 20 with an example virtual game overlaid thereon by a wearable device, according to an example embodiment of the present invention.

For instance, various virtual entity images are displayed to user 102 by wearable device 1800 that correspond to the game of lacrosse. As shown in FIG. 21, processed environment view 108 includes tree 2002, real-world game participant 2004, lot 2006, and house 2008, and further includes a virtual scoreboard 2102, a virtual goal 2104, a virtual lacrosse stick 2106, a virtual ball 2108, a virtual opponent 2110, a virtual player outfit 2112, and virtual field marker lines 2114. Virtual scoreboard 2102 is positioned to in front of tree 2002 to partially conceal tree 2002. Virtual scoreboard 2102 is configured by game engine 1802 to display a score of the game. Virtual goal 2104 is positioned at an end of a virtual game field indicated by virtual field marker lines 2114. Real world game participant 2004 is provided with virtual lacrosse stick 2106 that conceals handheld game controller 2010. Wearable device 1800 is configured to virtually replace handheld game controller 2010 with virtual lacrosse stick 2106. Real world game participant 2004 may pick up virtual ball 2108 using virtual lacrosse stick 2106 (by moving handheld game controller 2010), and may score a goal by throwing virtual ball 2008 into virtual goal 2104 using virtual lacrosse stick 2106 (by moving handheld game controller 2010). Virtual opponent 2110 may attempt to try to prevent real-world game participant 2004 from scoring a goal by intercepting virtual ball 2108 or otherwise virtually interacting with real world game participant 2004 according to the rules of lacrosse. User 102 may interact in the game using a virtual lacrosse stick (not visible in FIG. 21) as a teammate or opponent of real-world game participant 2004, for example.

As described above, real world game participant 2004 may use handheld game controller 2010. Handheld game controller 2010 may be similar to the Wii Remote™ distributed for the Nintendo® Wii™ game console by Nintendo Company Ltd, of Kyoto, Japan, for example. Movements of handheld game controllers 2010 held by user 102 and/or real world game participant 2004 can be tracked by wearable device 1800 to aid in simulating a tennis court, a boxing ring (complete with bystanders), a golf course, a bowling alley, or a baseball stadium, for example, in a virtual environment. For example, controller 2010 may include a RFID tag, an infrared emitter, or other mechanism enabling its motions to be tracked. Games, such as a virtual boxing match may be undertaken between user 102 and real-world game participant 2004 using controller 2010. The surroundings may be replaced by a virtual boxing ring environment generated by wearable device 1800 that is viewable by user 102. User 102 and real-world game participant 2004 may be enabled to virtually fight against each other in this manner.

These examples of wearable device 1800 enabling user 102 to participate in the above described game environments are provided for illustrative purposes, and are not intended to be limiting. Any type of game environment may be enabled by wearable device 1800 that includes any number of virtual entities and real world entities. Further example embodiments are described as follows:

1. A capture the flag game can be enabled by wearable device 1800. For example, user 102 may travel to a specific physical location and make a specific hand movement in order to capture a virtual flag.

2. A virtual Pac-man game may be enabled by wearable device 1800. For example, user 102 may travel along a specific path in order to touch floating virtual dots suspended in his/her field of vision by wearable device 1800 (this approach can be modified to lead a wearer to a location by walking by following virtual "bread crumbs").

3. A virtual maze can be generated in an open field by wearable device 1800. User 102 may be enabled to navigate the virtual maze by wearable device 1800 by walking through the virtual maze.

4. An open space can have any kind of field virtually imposed upon it by wearable device 1800. For example, a soccer game can be enabled to be played with a virtual ball, a civil war strategy game can be enabled to be played with the real world participants wearing virtual period clothing and brandishing virtual period weapons. Real world physical characteristics can be embedded directly in the game, such as enabling a hill to be overtaken by an opposing force, etc.

5. A laser tag game can be enabled to be played in the real world by wearable device 1800, using virtual laser guns, and using real world physical objects to block shots, etc.

6. Virtual people, avatars, cartoon characters, etc., can be generated by wearable device 1800 to provide user 102 with clues in order to move forward in a game.

7. A virtual World Of Warcraft-type overlay can be generated that is superimposed on the real world by wearable device 1800 instead of being viewed on a computer screen. According to the virtual overlay, user 102 can be enabled to play in the real world, but be fighting virtual characters. Note that in any game, wearable device 1800 may be enabled with overrides configured to reveal real world entities to user 102 as required to avoid real world dangers/accidents/collisions.

8. User 102, real world game participant 2004, and/or other real world game participants may each be wearing a corresponding wearable device 1800, and may be enabled by game engine 1802 (which may be located in a separate server) to interact in games together. For example, user 102 and the other game participants may be enabled to re-enact famous battles or points of time in history. For example, the battle of Gettysburg may be virtually reenacted while user 102 and the other game participants stand, walk, and/or run in a common field. Wearable device 1800 may be configured to virtually overlay the armies over the real world field. As user 102 turns his/her head wearable device 1800 correspondingly re-aligns the virtual infantry over the hills.

9. In typical "cosplay," or "costume play," a person physically dresses like their favorite character and can emulate that character. Using wearable device 1800 as a cosplay device, user 102 can simulate the appearance of their favorite characters appearance by virtually applying their appearance/clothing to them self, and to other cosplay participants.

10. Amateur and professional sports players can wear wearable devices 1800 in order to receive real time play information from their coaches. For example, a football game may no longer require huddles for the players to confer with each other or for the coach to confer with the players, but instead, plays may be fed in real time to the players through wearable devices 1800 while they are on the field. Wearable device 1800 may be configured to display to user 102 where user 102 needs to go on the field in order to complete a play and to set up a next play.

11. A concert may be virtually displayed by wearable device 1800 to user 102. For example, wearable device 1800 may display a concert to user 102 of their favorite band. Wearable device 1800 may virtually overlay the concert at any place that user 102 is located, such as in a park full of people, or in the living room of user 102.

12. Monetization: Wearable device 1800 may enable monetizing of various aspects of games. For example, sponsors can use "reality show"-type virtual gaming to encourage individuals to perform tasks for rewards. Additional advertisement inventory can be generated by wearable device 1800 by displaying virtual advertisements on real world objects during games. Furthermore, any needed development infrastructure/platform for wearable device 1800 (e.g., a server for game engine 1802) can be resold/rented to game developers.

III. Example Computer Implementation

Note that wearable devices 104, 500, 1000, 1300, 1506, 1600, and 1800, computer 1502, and server 1504 may each include hardware, software, firmware, or any combination thereof to perform their respective functions. For example, any one or more of wearable devices 104, 500, 1000, 1300, 1506, 1600, and 1800, computer 1502, and server 1504 may include computer code configured to be executed in one or more processors. Alternatively or additionally, any one or more of wearable devices 104, 500, 1000, 1300, 1506, 1600, and 1800, computer 1502, and server 1504 may be implemented in hardware logic/electrical circuitry.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for enabling wearable devices 104, 500, 1000, 1300, 1506, 1600, and 1800, computer 1502, server 1504, flowchart 900 of FIG. 9, flowchart 1100 of FIG. 11, flowchart 1200 of FIG. 12, flowchart 1900 of FIG. 19, and/or further embodiments of the present invention described herein. Embodiments of the present invention are directed to computer program products comprising such logic (e.g., in the form of program code) stored on any computer useable medium. Such program code, when executed in a processing unit (that includes one or more data processing devices), causes a device to operate as described herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
    determining, by at least one processing unit, information related to a movable physical entity among a plurality of physical entities located in an area viewable through a wearable device;
    acquiring, by the at least one processing unit, image information representative of a virtual entity, the image information representative of the virtual entity being based on the information related to the movable physical entity, the information related to the movable physical entity comprising a position of the movable physical entity;
    generating, by the at least one processing unit, an image of the virtual entity based on the image information representative of the virtual entity in order to enable the virtual entity to appear to be present in a same area;
    tracking, by the at least one processing unit, the position of the movable physical entity in the area, wherein the movable physical entity is visible through the wearable device, and wherein the tracking comprises:
        capturing an image of the movable physical entity by a camera of the wearable device; and
        processing the captured image to determine the position of the movable physical entity in the area, wherein the position of the movable physical entity comprises a distance between the movable physical entity and the wearable device; and
    displaying the virtual entity to be overlaid on at least a portion of the movable physical entity in the same area to overlay, with the virtual entity, the at least the portion of the movable physical entity that would be visible through the wearable device by scaling a size of the virtual entity to be overlaid on the at least the portion of the movable physical entity based on the distance between the movable physical entity and the wearable device,
    wherein the virtual entity is displayed on a lens of the wearable device optically aligned with the movable physical entity.

2. The method of claim 1, wherein the information related to the movable physical entity further comprises at least one of an orientation of the movable physical entity and a speed at which the movable physical entity is moving.

3. The method of claim 1, wherein the virtual entity is at least one of a virtual character of a game, a virtual implement of the game and a virtual feature of the game.

4. The method of claim 1, wherein the determining comprises:
    determining information related to the wearable device, the information related to the wearable device comprising at least one of a location of the wearable device, an orientation of the wearable device, and a speed at which the wearable device is moving.

5. The method of claim 4, wherein the acquiring comprises:
    acquiring the image information representative of the virtual entity based on the information related to the wearable device and the information related to the movable physical entity.

6. The method of claim 1, further comprising:
    acquiring updated image information representative of the virtual entity that is based at least on updated information related to the area; and
    generating, using the updated image information, an updated image of the virtual entity.

7. The method of claim 1, further comprising:
    generating, using the image information, a second image of the virtual entity as a virtual entity display region of the wearable device.

8. The method of claim 1, wherein the movable physical entity is a handheld game controller, the virtual entity comprises a virtual implement of a game and the displaying of the virtual entity comprises displaying the virtual implement of the game to be overlaid on at least a portion of the handheld game controller.

9. The method of claim 1, further comprising:
    identifying the movable physical entity using pattern recognition.

10. The method of claim 1, wherein the virtual entity comprises a virtual advertisement related to a physical object.

11. A non-transitory computer readable storage medium tangibly encoded with computer-executable instructions that when executed by a processor associated with a computing device perform a method comprising:
  determining information related to a movable physical entity among a plurality of physical entities located in an area viewable through a wearable device;
  acquiring image information representative of a virtual entity, the image information representative of the virtual entity based on the information related to the movable physical entity, the information related to the movable physical entity comprising a position of the movable physical entity;
  generating an image of the virtual entity based on the image information representative of the virtual entity in order to enable the virtual entity to appear to be present in a same area using the wearable device;
  tracking the position of the movable physical entity in the area, wherein the movable physical entity is visible through the wearable device, and wherein the tracking comprises:
    capturing an image of the movable physical entity by a camera of the wearable device; and
    processing the captured image to determine the position of the movable physical entity in the area, wherein the position of the movable physical entity comprises a distance between the movable physical entity and the wearable device;
  displaying the virtual entity to be overlaid on at least a portion of the movable physical entity in the same area to overlay, with the virtual entity, the at least the portion of the movable physical entity that would be visible through the wearable device by scaling a size of the virtual entity to be overlaid on the at least the portion of the movable physical entity based on the distance between the movable physical entity and the wearable device,
  wherein the virtual entity is displayed on a lens of the wearable device optically aligned with the movable physical entity.

12. The non-transitory computer-readable storage medium of claim 11, wherein the information related to the movable physical entity further comprises at least one of an orientation of the movable physical entity and a speed at which the movable physical entity is moving.

13. The non-transitory computer-readable storage medium of claim 11, wherein the virtual entity comprises a virtual advertisement related to a physical object.

14. The non-transitory computer-readable storage medium of claim 11, wherein the method further comprises:
  acquiring updated image information representative of the virtual entity that is based at least on updated information related to the area; and
  generating, using the updated image information, an updated image of the virtual entity.

15. The non-transitory computer-readable storage medium of claim 11, wherein the virtual entity is at least one of a virtual character of a game, a virtual implement of the game and a virtual feature of the game.

16. A wearable device comprising:
  a camera;
  a processor; and
  a non-transitory storage medium for tangibly storing thereon program logic for execution by the processor, the program logic comprising:
    determining logic executed by the processor for determining information related to a movable physical entity among a plurality of physical entities located in an area viewable through the wearable device;
    acquiring logic executed by the processor for acquiring image information representative of a virtual entity, the image information representative of the virtual entity being based on the information related to the movable physical entity, the information related to the movable physical entity comprising a position of the movable physical entity;
    generating logic executed by the processor for generating an image of the virtual entity based on the image information representative of the virtual entity in order to enable the virtual entity to appear to be present in a same area;
    tracking logic executed by the processor for tracking the position of the movable physical entity in the area, wherein the movable physical entity is visible through the wearable device, and wherein the tracking comprises:
      capturing an image of the movable physical entity by the camera; and
      processing the captured image to determine the position of the movable physical entity in the area, wherein the position of the movable physical entity comprises a distance between the movable physical entity and the wearable device;
    aligning logic executed by the processor for displaying the virtual entity to be overlaid on at least a portion of the movable physical entity in the same area to overlay, with the virtual entity, the at least the portion of the movable physical entity that would be visible through the wearable device by scaling a size of the virtual entity to be overlaid on the at least the portion of the movable physical entity based on the distance between the movable physical entity and the wearable device,
  wherein the virtual entity is displayed on a lens of the wearable device optically aligned with the movable physical entity.

* * * * *